United States Patent
Hu et al.

(10) Patent No.: US 12,457,517 B2
(45) Date of Patent: Oct. 28, 2025

(54) COMMUNICATION METHOD AND APPARATUS, READABLE STORAGE MEDIUM, AND SYSTEM

(71) Applicant: HUAWEI TECHNOLOGIES CO., LTD., Shenzhen (CN)

(72) Inventors: Xingxing Hu, Shanghai (CN); Tingting Geng, Shanghai (CN); Xudong Yang, Shanghai (CN); Dawid Koziol, Leuven (BE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 396 days.

(21) Appl. No.: 18/304,636

(22) Filed: Apr. 21, 2023

(65) Prior Publication Data
US 2023/0308925 A1    Sep. 28, 2023

Related U.S. Application Data

(63) Continuation of application No. PCT/CN2021/124513, filed on Oct. 18, 2021.

(30) Foreign Application Priority Data

Oct. 23, 2020   (WO) ............... PCT/CN2020/123244

(51) Int. Cl.
*H04W 76/30*   (2018.01)
*H04B 17/309*   (2015.01)
*H04W 24/10*   (2009.01)

(52) U.S. Cl.
CPC .......... *H04W 24/10* (2013.01); *H04B 17/309* (2015.01); *H04W 76/30* (2018.02)

(58) Field of Classification Search
CPC ..... H04W 24/10; H04W 76/30; H04W 36/08; H04W 28/0268; H04W 24/08; H04B 17/309
See application file for complete search history.

(56) References Cited

U.S. PATENT DOCUMENTS

| | | |
|---|---|---|
| 2015/0010208 A1 | 1/2015 | Phan et al. |
| 2020/0112868 A1 | 4/2020 | Shariat et al. |

(Continued)

FOREIGN PATENT DOCUMENTS

| | | |
|---|---|---|
| CN | 103107958 A | 5/2013 |
| CN | 105264790 A | 1/2016 |

(Continued)

OTHER PUBLICATIONS

3GPP TR 38.890 V17.0.0 (Apr. 2021), 3rd Generation Partnership Project; Technical Specification Group Radio Access Network; Study on NR QoE (Quality of Experience) management and optimizations for diverse services(Release 17), 18 pages.

(Continued)

*Primary Examiner* — Chuong A Ngo
(74) *Attorney, Agent, or Firm* — HAUPTMAN HAM, LLP

(57) ABSTRACT

Embodiments of this application provide a communication method and apparatus. The method includes: A terminal receives first application layer measurement configuration information from a first base station; performs quality of experience QoE measurement based on the first application layer measurement configuration information; receives a first message from a second base station, where the first message indicates whether to retain the first application layer measurement configuration information; and continues to perform QoE measurement when the first message indicates to retain the first application layer measurement configuration information; and/or releases the first application layer measurement configuration information when the first message indicates to not retain the first application layer measurement configuration information. This can reduce overheads, for example, signaling overheads or storage overheads, of application layer measurement configuration, (Continued)

or improve accuracy of an application layer measurement result for a specific service.

21 Claims, 11 Drawing Sheets

(56) References Cited

U.S. PATENT DOCUMENTS

2023/0216751 A1* 7/2023 Barac .................. H04L 45/243 455/423
2024/0015550 A1* 1/2024 Parichehrehteroujeni .................. H04W 24/08

FOREIGN PATENT DOCUMENTS

| CN | 106576094 A | 4/2017 |
| EP | 3583804 B1 | 3/2021 |
| WO | 2019030737 A1 | 2/2019 |
| WO | 2019065617 A1 | 4/2019 |
| WO | 2020128657 A1 | 6/2020 |
| WO | 2020154841 A1 | 8/2020 |

OTHER PUBLICATIONS

ZTE, China Telecom, China Unicom, Discussion on Measurement Collection and Continuity in Intra-SystemIntra-RAT Mobility. 3GPP TSG-RAN WG3 #113-e, Aug. 16-26, 2021, R3-214045, 8 pages.
Extended European Search Report issued in corresponding European Application No. 21881974.6, dated Mar. 4, 2024, pp. 1-17.
Ericsson, QoE Measurement Collection in NR. 3GPP TSG RAN WG2 #106, Reno, US, May 13-17, 2019, R2-1906232, 3 pages.
3GPP TS 26.114 V16.7.0:"3rd Generation Partnership Project; Technical Specification Group Services and System Aspects;IP Multimedia Subsystem (IMS);Multimedia Telephony;Media handling and interaction(Release 16)",Sep. 2020, total 445 pages.
3GPP TSG-RAN WG2 Meeting #110-e,R2-2007940, Discussion on QoE in NR , ZTE Corporation, Sanechips, Electronic meeting, Jun. 1-12, 2020,7 pages.
3GPP TS 26.247 V16.4.1:"3rd Generation Partnership Project;Technical Specification Group Services and System Aspects; Transparent end-to-end Packet-switchedStreaming Service (PSS);Progressive Download and Dynamic Adaptive Streaming over HTTP (3GP-DASH)(Release 16)",2020—10,total 140 pages.
3GPP TS 38.322 V16.1.0 (Jul. 2020), 3rd Generation Partnership Project; Technical Specification Group Radio Access Network; NR; Radio Link Control (RLC) protocol specification(Release 16), 33 pages.
3GPP TS 38.323 V16.2.0:"3rd Generation Partnership Project; Technical Specification Group Radio Access Network; NR;Packet Data Convergence Protocol (PDCP) specification (Release 16)",Sep. 2020,40 pages.
3GPP TS 38.331 v16.2.0:3rd Generation Partnership Project; Technical Specification Group Radio Access Network; NR;Radio Resource Control (RRC) protocol specification(Release 16),Sep. 2020,total 921 pages.
International Search Report issued in corresponding International Application No. PCT/CN2020/123244, mailed Jul. 21, 2021, pp. 1-10.
International Search Report issued in corresponding International Application No. PCT/CN2021/124513, mailed Jan. 18, 2022, pp. 1-3.
Written Opinion issued in corresponding International Application No. PCT/CN2021/124513, mailed Jan. 18, 2022, pp. 1-3.

* cited by examiner

COMMUNICATION METHOD AND APPARATUS, READABLE STORAGE MEDIUM, AND SYSTEM

CROSS-REFERENCE TO RELATED APPLICATIONS

This application is a continuation of International Application No. PCT/CN2021/124513, filed on Oct. 18, 2021, which claims priority to International Application No. PCT/CN2020/123244, filed on Oct. 23, 2020. The disclosures of the aforementioned applications are hereby incorporated by reference in their entireties.

TECHNICAL FIELD

This application relates to the field of wireless communication technologies, and in particular, to a communication method and apparatus, a readable storage medium, and a system.

BACKGROUND

A minimization of drive-tests (minimization of drive-tests, MDT) technology is a technology in which an operator performs measurement by using commercial terminals of subscribed users and sends a measurement result to partially replace conventional drive tests, to automatically collect terminal measurement data, so as to detect and optimize problems and faults in a wireless network. Application scenarios of the technology include: The operator generally performs a routine network coverage drive test every month, and performs a call quality drive test on a specific region in response to a user complaint. The drive tests in these scenarios can be replaced by the MIDT. The MDT technology may have several measurement types as follows:

1. Signal level measurement: User equipment (user equipment, UE) measures a signal level of a wireless signal, and sends a measurement result to a base station or a base station controller.

2. Quality of service (quality of service, QoS) measurement: QoS measurement is generally performed by a base station, for example, measurement of one or more of traffic of a service, a throughput of a service, a service delay, and the like; or may be performed by UE, for example, measurement of an uplink processing delay; or may be jointly performed by a base station and UE, for example, measurement of an air interface delay. The air interface delay can be measured by measuring time elapsed since a data packet passes through a service data adaptation protocol (service data adaptation protocol, SDAP) SDAP/packet data convergence protocol (packet data convergence protocol, PDCP) layer of the base station until the data packet reaches an SDAP/PDCP layer of the UE.

3. Accessibility measurement: UE records information about radio resource control (radio resource control, RRC) connection setup failure and sends the information to the base station or the base station controller.

The MDT may include a logged MDT (logged MDT) and an immediate MDT (immediate MDT). The immediate MDT is measurement mainly performed on UE in a radio resource control (radio resource control, RRC) connected state (RRC_CONNECTED), and the logged MDT is measurement mainly performed on UE in an idle state (RRC_IDLE) or UE in an RRC inactive state (RRC_INACTIVE) (for example, the UE in the idle state or the UE in the inactive state measures one or more of a neighboring cell corresponding to a frequency corresponding to a cell on which the UE currently camps and an inter-frequency/inter-system neighboring cell corresponding to cell reselection broadcast in the cell on which the UE currently camps). The immediate MDT is generally used to measure one or more of a data volume, an internet protocol (internet protocol, IP) throughput, a packet transmission delay, a packet loss rate, a processing delay, and the like of the UE. The logged MDT generally refers to measurement performed by the UE on received signal strength.

In two scenarios, the base station initiates an MDT measurement collection task. One is to initiate signaling-based MDT (signaling-based MDT) and the other is to initiate management-based MDT (management-based MDT). The signaling-based MDT is UE-specific MDT, where the base station receives a message indicating to perform the MDT on specific UE from a core network (core network, CN). The management-based MDT is not the UE-specific MDT, where the base station receives a message indicating to perform MDT from an operation, administration and maintenance (operation, administration and maintenance, OAM) or an element management (element manager, EM). The base station selects, according to a policy, UE from UEs under the base station to perform MDT measurement. For the signaling-based MDT, the CN does not initiate signaling-based MDT for the UE unless a user has agreed to perform MDT. For the management-based MDT, when selecting UE, the base station may consider whether the UE agrees to perform MDT, for example, select only UE that agrees to perform MDT to perform MDT measurement (for example, the core network notifies the base station of whether UE agrees to perform MDT, for example, the CN notifies a radio access network (radio access network, RAN) of a management-based MDT allowed indication (Allowed indication) of the UE, and optionally, also notifies a management-based MDT public land mobile network (public land mobile network, PLMN) list). Both the management-based MDT and the signaling-based MDT may include the logged MDT and the immediate MDT. For the signaling-based MDT, the CN notifies the base station of one or more of some MDT configuration information, a trace collection entity (trace collection entity, TCE) IP address, and the like. The MDT configuration information includes one or more of the following: an MDT activation type (for example, immediate MDT only (Immediate MDT only), logged MDT only (Logged MDT only), immediate MDT and trace (Immediate MDT and Trace)), an MDT region range, an MDT mode, a configuration parameter (for example, one or more of an immediate MDT measurement event, a logged MDT recording interval, and duration) of a corresponding MDT mode, and a signaling-based MDT PLMN list. The MDT region range is a region range in which MDT measurement is performed, for example, a cell list or a tracking region list. The MDT mode includes one or both of the immediate MDT and the logged MDT.

For some streaming-type services or voice services, for example, a streaming service (streaming service) and a multimedia telephony service for an IP multimedia system (Multimedia Telephony Service for IMS, MTSI), only quality of a signal cannot reflect user experience of these services. Operators want to know user experience and optimize a network to improve user experience. This type of measurement collection is referred to as quality of experience (quality of experience, QoE) measurement collection, and may also be referred to as application layer measurement collection. This type of measurement is also initiated by using the signaling-based MDT and the management-based MDT.

The application layer measurement collection is configured by the base station. How to configure the application layer measurement collection is a problem to be urgently studied.

SUMMARY

Embodiments of this application provide a communication method and apparatus, and in particular, provide an application layer measurement configuration method, to reduce overheads, for example, signaling overheads or storage overheads, of application layer measurement configuration, or improve accuracy of an application layer measurement result for a specific service.

A first aspect of embodiments of this application provides a communication method, including:

A terminal receives first application layer measurement configuration information from a first base station;

the terminal performs quality of experience QoE measurement based on the first application layer measurement configuration information;

the terminal receives a first message from a second base station, where the first message indicates whether to retain the first application layer measurement configuration information; and the terminal continues to perform QoE measurement when the first message indicates to retain the first application layer measurement configuration information; and/or the terminal releases the first application layer measurement configuration information when the first message indicates to not retain the first application layer measurement configuration information.

The first message includes one or more of the following: a message indicating radio resource control RRC resume, a message indicating a full configuration, a message indicating dual connectivity DC release and/or add, or a message indicating release of a secondary cell group SCG configuration.

The QoE measurement includes application layer measurement.

Optionally, that the first message indicates whether to retain the first application layer measurement configuration information includes: The first message includes a first indication information field, the first indication information field is a first value, the first value is one of two values, one of the two values indicates to retain the first application layer measurement configuration information, and the other of the two values indicates to release the first application layer measurement configuration information.

Alternatively, the first message includes a first indication information field, to indicate to retain the first application layer measurement configuration information, and the first message does not include the first indication information field, to indicate to release the first application layer measurement configuration information; or the first message includes a first indication information field, to indicate to release the first application layer measurement configuration information, and the first message does not include the first indication information field, to indicate to retain the first application layer measurement configuration information.

Optionally, the first message further includes information indicating a service type of the first application layer measurement configuration information.

Optionally, that the first message indicates whether to retain the first application layer measurement configuration information includes:

The first message indicates a service type of a first application layer measurement configuration that is to be retained or released, where the service type corresponds to the first application layer measurement configuration that is to be retained or released.

For example, when application layer measurement configuration information on a terminal includes only first application layer measurement configuration information, a first indication information field may indicate, through one bit, whether to retain a first application layer measurement configuration. For example, 1 indicates to retain the first application layer measurement configuration, and 0 indicates to release the first application layer measurement configuration. Alternatively, if the first indication information field is valid (or exists), it indicates to retain the first application layer measurement configuration, and if the first indication information field is invalid (or does not exist), it indicates to release the first application layer measurement configuration. Alternatively, if the first indication information field is valid (or exists), it indicates to release the first application layer measurement configuration, and if the first indication information field is invalid (or does not exist), it indicates to retain the first application layer measurement configuration.

When the application layer measurement configuration information on the terminal includes a plurality of pieces of application layer measurement configuration information, retaining or release of each piece of application layer measurement configuration information may be indicated by using a corresponding first indication information field, for example, indicated in a bitmap manner.

Alternatively, when application layer measurement configuration information is to be retained or released for a service type corresponding to the application layer measurement configuration information, and/or when the terminal may have application layer measurement configurations of one or more service types, but each service type corresponds to only one application layer measurement configuration, a service type may be indicated to indicate that an application layer measurement configuration corresponding to the service type is to be retained or released, or an application layer measurement configuration that is to be retained or released may be indicated, and a service type corresponding to the application layer measurement configuration is also indicated.

Alternatively, when the terminal has application layer measurement configurations of one or more service types, and each service type corresponds to one or more application layer measurement configurations, both an application layer measurement configuration that is to be retained or released and a service type corresponding to the application layer measurement configuration may be indicated. Alternatively, when identifiers of application layer measurement configurations corresponding to different service types are different, an application layer measurement configuration that is to be retained or released may be indicated without indicating a service type corresponding to the application layer measurement configuration.

Optionally, that the terminal continues to perform QoE measurement when the first message indicates to retain the first application layer measurement configuration information includes:

An access stratum AS of the terminal determines, based on the first message, that the first application layer measurement configuration information is to be retained, and sends a second message to an upper layer of the AS, where the second message indicates that the first application layer measurement configuration information is to be retained.

Optionally, before the upper layer of the AS of the terminal receives the second message, the upper layer of the AS has released the first application layer measurement configuration, and the method further includes:

The AS sends the first application layer measurement configuration information to the upper layer of the AS.

In this way, not both the AS and the upper layer of the AS may need to retain the first application layer measurement configuration information, thereby reducing storage overheads.

Optionally, the method further includes: The AS sends the information indicating the service type corresponding to the first application layer measurement configuration information to the upper layer of the AS.

Optionally, that the terminal releases the first application layer measurement configuration information when the first message indicates to not retain the first application layer measurement configuration information includes:

The access stratum AS of the terminal determines, based on the first message, that the first application layer measurement configuration information is to be released, and sends a second message to the upper layer of the AS, where the second message indicates that the first application layer measurement configuration information is to be released.

In a first possible implementation, the first message is the message that is from the second base station and that indicates the radio resource control RRC resume.

The first message indicates the terminal to enter a radio resource control connected RRC_CONNECTED state from a radio resource control inactive RRC_INACTIVE state.

Optionally, after the first application layer measurement configuration information is received and before the first message is received, the method further includes:

receiving, from a third base station, a message for notifying that the terminal enters the radio resource control inactive RRC_INACTIVE state; and sending a message for requesting the RRC resume to the second base station, where the message for notifying that the terminal enters the radio resource control inactive RRC_INACTIVE state indicates whether the terminal retains the first application layer measurement configuration information.

Optionally, the message for notifying that the terminal enters the radio resource control inactive RRC_INACTIVE state further indicates the service type corresponding to the first application layer measurement configuration information.

Optionally, the first base station is a master node MN in dual connectivity, and the second base station is a secondary node SN in the dual connectivity.

Alternatively, the first base station is a secondary node SN in dual connectivity, and the second base station is a master node MN in the dual connectivity.

Optionally, when the first base station is the master node or the secondary node in base stations that perform dual connectivity with the terminal, the first message further indicates a type of a base station corresponding to the first application layer measurement configuration, and the type includes the master node and/or the secondary node.

In this way, the method in this aspect may be applied in a specific UE state switching process, and by indicating whether to retain the first application layer measurement configuration information when the terminal enters the RRC_INACTIVE state, a requirement of a base station is consistent with a behavior of a UE side, to avoid a problem of overheads or inaccurate application layer measurement caused by inconsistency.

In a second possible implementation, the first message is the message that is from the second base station and that indicates the full configuration or the message indicating multi-radio dual connectivity MR-DC release and/or add.

Optionally, the first base station is a master node or a secondary node in base stations in dual connectivity, and the second base station is the master node in the base stations in the dual connectivity.

In this way, the method in this aspect may be applied in a specific full configuration or MR-DC release and/or add process.

In a third possible implementation, the first application layer measurement configuration information is configured by a secondary node in dual connectivity, the first message is the message that is from the second base station and that indicates release of the secondary cell group configuration, and a secondary cell group is a cell managed by the secondary node.

Optionally, the retained first application layer measurement configuration information is used for application layer measurement of a master node.

Optionally, the first base station is a secondary node or a master node in base stations in dual connectivity, and the second base station is the master node in the base stations in the dual connectivity.

Optionally, the method further includes:
receiving third indication information from the second base station, where the third indication information indicates to send a measurement result for the first application layer measurement configuration information to the second base station.

Optionally, the method further includes:
receiving fourth indication information from the second base station, where the fourth indication information indicates a radio bearer, for example, a signaling radio bearer, used to transmit a measurement result corresponding to a first application layer measurement configuration.

In this way, the method in this aspect may be applied in a specific MCG configuration release process.

According to the method provided in embodiments of this application, an application layer measurement configuration method may be provided, to reduce overheads, for example, signaling overheads or storage overheads, of application layer measurement configuration, or improve accuracy of an application layer measurement result for a specific service.

A second aspect of embodiments of this application provides a communication method, including:

A first base station sends a first message to a terminal, where the first message indicates whether to retain first application layer measurement configuration information.

The first application layer measurement configuration information is received by the terminal from a second base station before the first message is received, and the first application layer measurement configuration information is used for quality of experience QoE measurement of the terminal. The QoE measurement includes application layer measurement.

The method may further include:

The first base station receives a measurement result for the first application layer measurement configuration information obtained from the terminal.

Optionally, the first message includes one or more of the following: a message indicating radio resource control RRC resume, a message indicating a full configuration, a message indicating dual connectivity DC release or add, or a message indicating release of a secondary cell group SCG configuration.

Optionally, that the first message indicates whether to retain the first application layer measurement configuration information includes: The first message includes a first indication information field, the first indication information field is a first value, the first value is one of two values, one of the two values indicates to retain the first application layer measurement configuration information, and the other of the two values indicates to release the first application layer measurement configuration information.

Alternatively, the first message includes a first indication information field, to indicate to retain the first application layer measurement configuration information, and the first message does not include the first indication information field, to indicate to release the first application layer measurement configuration information; or the first message includes a first indication information field, to indicate to release the first application layer measurement configuration information, and the first message does not include the first indication information field, to indicate to retain the first application layer measurement configuration information.

Optionally, the first message further includes information indicating a service type of the first application layer measurement configuration information.

Optionally, that the first message indicates whether to retain the first application layer measurement configuration information includes:

The first message indicates a service type of a first application layer measurement configuration that is to be retained or released, where the service type corresponds to the first application layer measurement configuration that is to be retained or released.

In a first possible implementation of the second aspect, the first message is the message indicating the radio resource control RRC resume, and indicates the terminal to enter a radio resource control connected RRC_CONNECTED state from a radio resource control inactive RRC_INACTIVE state.

The method may further include:

The first base station receives an RRC resume request message from the terminal.

Optionally, the method further includes:

The second base station sends the first application layer measurement configuration information to the terminal.

The first base station is a master node in dual connectivity, and the second base station and the first base station are a same base station; or the first base station is a master node in dual connectivity, the second base station is a master node in the dual connectivity, and the first base station and the second base station are different base stations.

Optionally, the second base station further sends the service type corresponding to the first application layer measurement configuration information to the terminal.

Optionally, the method further includes:

A third base station sends a message for notifying that the terminal enters the radio resource control inactive RRC_INACTIVE state to the first base station, where the message for notifying that the terminal enters the radio resource control inactive RRC_INACTIVE state indicates whether the terminal retains the first application layer measurement configuration information. The third base station and the first base station may be a same base station or different base stations.

Optionally, the message for notifying that the terminal enters the radio resource control inactive RRC_INACTIVE state further indicates the service type corresponding to the first application layer measurement configuration information.

Optionally, that the message for notifying that the terminal enters the radio resource control inactive RRC_INACTIVE state indicates whether the terminal retains the first application layer measurement configuration information includes:

The first message indicates a service type of a first application layer measurement configuration that is to be retained or released, where the service type corresponds to the first application layer measurement configuration that is to be retained or released.

In a second possible implementation of the second aspect, the first message is the message indicating the full configuration or the message indicating multi-radio dual connectivity MR-DC release and/or add. The message may be an RRC reconfiguration message.

Optionally, the second base station is a master node or a secondary node in base stations in dual connectivity, and the first base station is the master node in the base stations in the dual connectivity.

In a third possible implementation of the second aspect, the first application layer measurement configuration information is configured by a secondary node in base stations in dual connectivity, the first message is the message indicating release of the secondary cell group configuration, and a secondary cell group is a cell managed by the secondary node.

Optionally, the second base station is a secondary node or a master node in base stations in the dual connectivity, and the first base station is the master node in the base stations in the dual connectivity.

Optionally, the method further includes:

The first base station sends third indication information to the terminal, where the third indication information indicates to send a measurement result for the first application layer measurement configuration information to the first base station.

Optionally, the method further includes:

The first base station sends fourth indication information to the terminal, where the fourth indication information indicates a radio bearer, for example, a signaling radio bearer, used to transmit a measurement result corresponding to a first application layer measurement configuration. A third aspect of embodiments of this application provides a communication apparatus. The apparatus provided in this application has a function of implementing a behavior of the base station or the terminal in the foregoing method aspects, and includes a corresponding means (means) configured to perform the steps or the functions described in the foregoing method aspects. The steps or the functions may be implemented by using software, hardware, or a combination of hardware and software.

In a possible design, the apparatus includes one or more processors, and may further include a communication unit. The one or more processors are configured to support the apparatus in performing a corresponding function of a base station in the foregoing method. For example, a first message is generated. The communication unit is configured to support the apparatus in communicating with another device, to implement a receiving function and/or a sending function. For example, the first message is sent to a terminal.

The apparatus may further include one or more memories, where the memory is configured to be coupled to the processor, and the memory stores necessary program instructions and/or data of a base station. The one or more memories may be integrated with the processor, or may be disposed independent of the processor. This is not limited in this application.

The apparatus may be a base station, a gNB or TRP, a DU or CU, or the like. The communication unit may be a transceiver or a transceiver circuit. Optionally, the transceiver may alternatively be an input/output circuit or an interface.

The apparatus may alternatively be a chip, and the communication unit may be an input/output circuit or an interface that is of the chip.

In another possible design, the apparatus includes a transceiver, a processor, and a memory. The processor is configured to control the transceiver to send and receive a signal. The memory is configured to store a computer program. The processor is configured to run the computer program in the memory, so that the apparatus performs the method completed by the base station in the second aspect.

In a possible design, the apparatus includes one or more processors, and may further include a communication unit. The one or more processors are configured to support the apparatus in performing a corresponding function of a terminal in the foregoing methods. For example, quality of experience QoE measurement is performed based on first application layer measurement configuration information, and whether to retain the first application layer measurement configuration information is determined. The communication unit is configured to support the apparatus in communicating with another device, to implement a receiving function and/or a sending function. For example, a first message indicating whether to retain the first application layer measurement configuration information is received.

Optionally, the apparatus may further include one or more memories. The memory is configured to be coupled to the processor, and the memory stores necessary program instructions and/or data of the apparatus. The one or more memories may be integrated with the processor, or may be disposed independent of the processor. This is not limited in this application.

The apparatus may be a smart terminal, a wearable device, or the like. The communication unit may be a transceiver or a transceiver circuit. Optionally, the transceiver may alternatively be an input/output circuit or an interface.

The apparatus may alternatively be a chip, and the communication unit may be an input/output circuit or an interface that is of the chip.

In another possible design, the apparatus includes a transceiver, a processor, and a memory. The processor is configured to control the transceiver to send and receive a signal. The memory is configured to store a computer program. The processor is configured to run the computer program in the memory, so that the apparatus performs the method completed by the terminal in the first aspect.

According to a fourth aspect, a system is provided, and the system includes the foregoing base station.

Optionally, the system further includes the terminal.

According to a fifth aspect, a readable storage medium or a program product is provided, configured to store a program, where the program includes instructions used to perform the method in the first aspect or the second aspect.

According to a sixth aspect, a readable storage medium or a program product is provided, configured to store a program, where when the program is run on a computer, the computer is enabled to execute instructions of the method in the first aspect or the second aspect.

It should be understood that the technical solutions of the second aspect to the sixth aspect of this application correspond to the technical solution of the first aspect of this application. Beneficial effects achieved by the aspects and corresponding feasible implementations are similar, and details are not described again.

DESCRIPTION OF EMBODIMENTS

Figure 1:
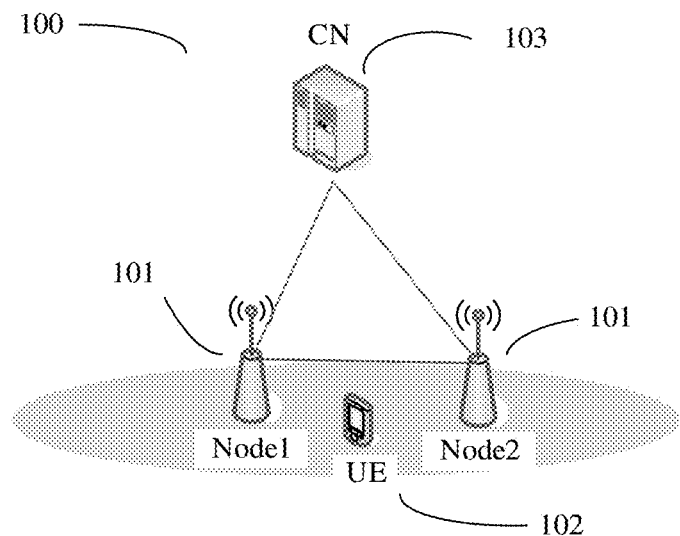
FIG. 1 is a schematic diagram of a communication system according to an embodiment of this application.

To clearly describe the technical solutions in embodiments of this application, terms such as "first" and "second" are used in embodiments of this application to distinguish between same items or similar items that provide basically same functions or purposes. For example, first information and second information are merely used to distinguish between different information, and do not limit sequences of the first information and the second information. A person skilled in the art may understand that the terms such as "first" and "second" do not limit a quantity or an execution sequence, and the terms such as "first" and "second" do not indicate a definite difference.

It should be noted that, in embodiments of this application, the word "example" or "for example" is used to represent giving an example, an illustration, or a description. Any embodiment or design scheme described as an "example" or "for example" in this application should not be explained as being more preferred or having more advantages than another embodiment or design scheme. Exactly, use of the terms such as "for example" or "example" is intended to present a related concept in a specific manner.

In embodiments of this application, "at least one" refers to one or more, and "a plurality of" refers to two or more. A term "and/or" describes an association relationship between associated objects and represents that three relationships may exist. For example, A and/or B may represent the following cases: Only A exists, both A and B exist, and only B exists, where A and B may be singular or plural. The character "/" generally indicates an "or" relationship between the associated objects, but may also indicate an "and/or" relationship. For details, refer to the foregoing and later descriptions for understanding. At least one of the following items (pieces) or a similar expression thereof indicates any combination of these items, including a single item (piece) or any combination of a plurality of items (pieces). For example, at least one item (piece) of a, b, or c may indicate: a, b, c, a and b, a and c, b and c, or a, b, and c, where a, b, and c may be singular or plural.

The technical solutions in embodiments of this application may be applied to various communication systems such as a long term evolution (long term evolution, LTE) system, a worldwide interoperability for microwave access (worldwide interoperability for microwave access, WiMAX) communication system, a 5th generation (5th Generation, 5G) system, for example, a new radio access technology (new radio access technology, NR) system, a network that integrates a plurality of systems, an internet of things system, an internet of vehicles system, and a future communication system such as a 6G system.

The network architecture and the service scenario described in embodiments of this application are intended to describe the technical solutions in embodiments of this application more clearly, and do not constitute a limitation on the technical solutions provided in embodiments of this application. A person of ordinary skill in the art may know that: With the evolution of the network architecture and the emergence of new service scenarios, the technical solutions provided in embodiments of this application are also applicable to similar technical problems.

In embodiments of this application, different base stations may be base stations having different identifiers, or may be base stations that have a same identifier and that are deployed at different geographical locations. In some scenarios, before a base station is deployed, the base station does not know whether the base station is related to a scenario to which embodiments of this application are applied. The base station or a baseband chip may support the methods provided in embodiments of this application before being deployed. In some scenarios, the methods provided in embodiments of this application may alternatively be supported through upgrade or loading after deployment. It may be understood that the foregoing base stations having the different identifiers may be base station identifiers, or may be cell identifiers or other identifiers.

In embodiments of this application, an NR network scenario in a wireless communication network is used as an example to describe some scenarios. It should be noted that the solutions in embodiments of this application may further be applied to another wireless communication network, and a corresponding name may also be replaced with a name of a corresponding function in the another wireless communication network.

For ease of understanding embodiments of this application, a communication system shown in FIG. 1 is first used as an example to describe in detail a communication system applicable to embodiments of this application. FIG. 1 is a schematic diagram of a communication system applicable to a communication method according to an embodiment of this application. As shown in FIG. 1, the communication system 100 includes access network devices 101 (Node1 and Node2), UE 102, and a core network CN device 103. The access network device 101 may be configured with a plurality of antennas, and the UE 102 may also be configured with a plurality of antennas. The access network device and the core network device may be collectively referred to as a network device or a network side device, and an access network and a core network may be collectively referred to as a network side.

It should be understood that the access network device and a terminal may further include a plurality of components (for example, a processor, a modulator, a multiplexer, a demodulator, or a demultiplexer) related to signal sending and receiving.

The access network device is a radio access network (radio access network, RAN) node (or device) that connects the terminal to a wireless network, and may also be referred to as a base station. The access network device is a device with a wireless transceiver function or a chip that may be disposed in the device. The device includes, but not limited to: an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB or a home NodeB, HNB), a baseband unit (baseband unit, BBU), and an access point (access point, AP) in a wireless fidelity (wireless fidelity, Wi-Fi) system, a wireless relay node, a wireless backhaul node, a transmission and reception point (transmission and reception point, TRP, or transmission point, TP), and the like. Alternatively, the device may be a gNB or a transmission point (TRP or TP) in a 5G system, for example, an NR system, one antenna panel or a group (including a plurality of antenna panels) of antenna panels of a base station in a 5G system, a network node, for example, a baseband unit (BBU) or a distributed unit (distributed unit, DU) that constitutes a gNB or a transmission point, or the like.

Figure 2:
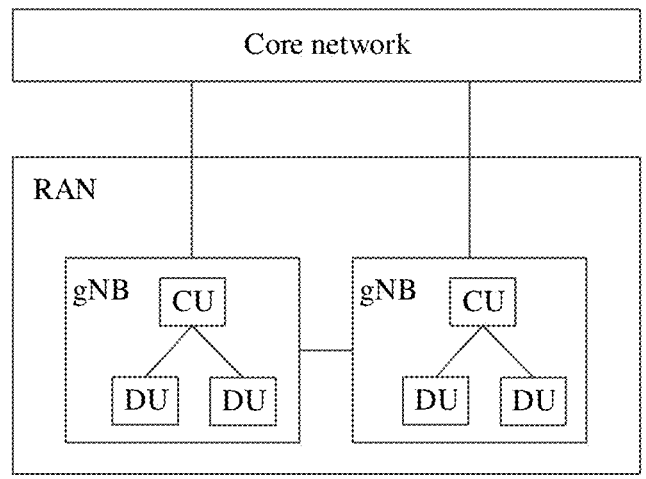
FIG. 2 is a schematic diagram of a network architecture in which a plurality of DUs share one CU according to an embodiment of this application.
Figure 3:
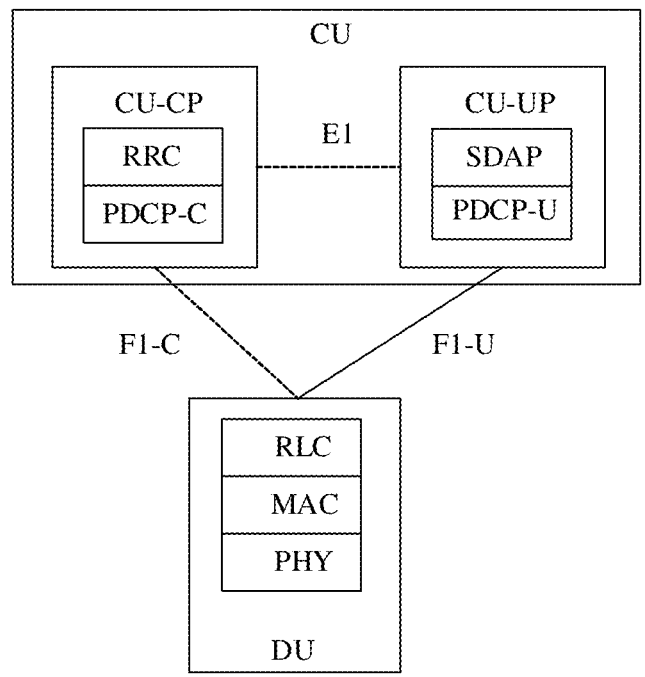
FIG. 3 is a schematic diagram of protocol layer functions of a CU and a DU according to an embodiment of this application.

In some deployments, the access network device (for example, the gNB) may include a central unit (central unit, CU) and a DU. The gNB may further include a radio unit (radio unit, RU). The CU and the DU may be understood as division of the base station from a perspective of logical functions. The CU and the DU may be physically separated or may be deployed together. For example, a plurality of DUs may share one CU, or one DU may be connected to a plurality of CUs, and the CU and the DU may be connected through an F1 interface. For example, FIG. 2 is a schematic diagram of a network architecture in which a plurality of DUs share one CU according to an embodiment of this application. As shown in FIG. 2, a core network and a RAN are interconnected and communicate with each other, and a base station in the RAN is divided into CUs and DUs, and a plurality of DUs share one CU. The network architecture shown in FIG. 2 may be used in a 5G communication system, or may share one or more components or resources with an LTE system. An access network device including a CU node and a DU node splits a protocol layer. Functions at some protocol layers are centrally controlled in the CU, and functions at remaining or all protocol layers are distributed in the DUs. The CU centrally controls the DUs. In an implementation, as shown in FIG. 3, the CU is deployed with a radio resource control (radio Resource Control, RRC) layer, a PDCP layer, and a service data adaptation protocol (service data adaptation protocol, SDAP) layer in a protocol stack; and the DU is deployed with a radio link control (radio link control, RLC) layer, a medium access control (medium access control, MAC) layer, and a physical layer (physical layer, PHY) in the protocol stack. Therefore, the CU is capable of processing the RRC, the PDCP, and the SDAP. The DU is capable of processing the RLC, the MAC, and the PHY It may be understood that the foregoing function division is merely an example, and does not constitute a limitation on the CU and the DU. In other words, there may be another function division manner between the CU and the DU. For example, some functions at the RLC layer and functions at protocol layers above the RLC layer are set in the CU, and remaining functions at the RLC layer and functions at protocol layers below the RLC layer are set in the DU. For example, the functions of the CU or the DU may alternatively be divided based on a service type of a call service, a voice service, or a short message service, or another system requirement. For example, the functions of the CU or the DU are divided based on a delay. A function whose processing time needs to meet a delay requirement may be set in the DU, and a function whose processing time does not need to meet the delay requirement may be set in the CU. For example, the CU may also have one or more functions of the core network, and one or more CUs may be disposed centrally, or may be disposed separately. For example, the CU may be disposed on a network side to facilitate centralized management, and the DU may have a plurality of radio frequency functions, or radio frequency functions may be disposed remotely. The functions of the CU may be implemented by one entity, or may be implemented by different entities. For example, the functions of the CU may be further divided. For example, a control plane (CP) is separated from a user plane (UP), that is, a CU control plane (CU-CP) and a CU user plane (CU-UP) are obtained. For example, the CU-CP and the CU-UP may be implemented by different function entities. The CU-CP and the CU-UP may be coupled to the DU to jointly implement functions of the base station. In a possible manner, the CU-CP is responsible for control plane functions, and mainly includes RRC and a PDCP control plane PDCP-C. The PDCP-C is mainly responsible for one or more of encryption and decryption, integrity protection, data transmission, and the like of control plane data. The CU-UP is responsible for a user plane function, and mainly includes an SDAP and a PDCP user plane PDCP-U. The SDAP is mainly responsible for processing data of a core network and mapping a data flow (flow) to a bearer. The PDCP-U is mainly responsible for encryption and decryption, integrity protection, header compression, serial number maintenance, data transmission, and the like of a data plane. The CU-CP is connected to the CU-UP through an E1 interface. The CU-CP represents that the access network device is connected to the core network through an Ng interface, and the CU-UP is connected to the DU through an F1-C(control plane). The CU-UP is connected to the DU through an F1-U (user plane). Certainly, in another possible implementation, the PDCP-C is implemented on the CU-UP. Information at the RRC layer eventually becomes information at the PHY layer, or is converted from information at the PHY layer. Therefore, in the architecture, higher layer signaling such as RRC layer signaling or PDCP layer signaling may also be considered as being sent by the DU or sent by the DU and the RU. It may be understood that the access network device may be a CU node, a DU node, or a device including the CU node and the DU node. In addition, the CU may be classified as a device in the radio access network RAN, or the CU may be classified as a device in the core network CN. This is not limited herein.

The terminal may also be referred to as a terminal device, user equipment (user equipment, UE), an access terminal, a subscriber unit, a subscriber station, a mobile terminal (mobile terminal, MT), a mobile console (mobile station, MS), a remote station, a remote terminal, a mobile device, a user terminal, a wireless communication device, a user agent, or a user apparatus. The terminal is a device that provides a user with voice and/or data connectivity. In embodiments of this application, the terminal may be a mobile phone (mobile phone), a tablet computer (pad), a computer having a wireless transceiver function, a wearable device, a mobile Internet device (mobile internet device, MID), a virtual reality (virtual reality, VR) terminal device, an augmented reality (augmented reality, AR) terminal device, a wireless terminal in industrial control (industrial control), a wireless terminal in self-driving (self-driving), a wireless terminal in remote medical (remote medical), a wireless terminal in a smart grid (smart grid), a wireless terminal in transportation safety (transportation safety), a wireless terminal in a smart city (smart city), a wireless terminal in a smart home (smart home), or the like. An application scenario is not limited in embodiments of this application. In this application, the methods and the steps that are implemented by the terminal device may also be implemented by a means (for example, a chip or a circuit) that may be used in the terminal device. In this application, the foregoing terminal and the means (for example, the chip or the circuit) that may be disposed in the foregoing terminal device are collectively referred to as a terminal.

The core network device is a device in a core network (core network, CN) that provides service support for the terminal. Currently, some examples of the core network device are an access and mobility management function (access and mobility management function, AMF) entity, a session management function (session management function, SMF) entity, a user plane function (user plane function, UPF) entity, and the like, which are not listed one by one herein. The AMF entity may be responsible for access management and mobility management of the terminal. The SMF entity may be responsible for session management, for example, user session establishment. The UPF entity may be a user-plane function entity, and is mainly responsible for a connection to an external network. It should be noted that an entity in this application may also be referred to as a network element or a function entity. For example, the AMF entity may also be referred to as an AMF network element or an AMF function entity. For another example, the SMF entity may also be referred to as an SMF network element or an SMF function entity.

In the communication system 100, both Node1 and Node2 may communicate with a plurality of UEs. However, it should be understood that the UE communicating with Node1 and the UE communicating with Node2 may be the same or different. The UE 102 shown in FIG. 1 can simultaneously communicate with Node1 and Node2. However, only a possible scenario is shown. In some scenarios, the UE may communicate with only Node 1 or Node2. This is not limited in this application. It should be understood that FIG. 1 is merely a simplified schematic diagram used as an example for ease of understanding. The communication system may further include another access network device, another terminal, or another core network device, which is not drawn in FIG. 1. In a new radio (new radio, NR) system and an LTE system, a radio resource control (radio resource control, RRC) state of the UE includes a connected state (RRC_CONNECTED), an idle state (RRC_IDLE), and an inactive state (RRC_INACTIVE, or referred to as a third state). The RRC inactive (inactive) state is a state newly introduced when the terminal is connected to a 5G core network through the base station, and the state is between the connected state and the idle state. In the RRC_INACTIVE state, there is no RRC connection between the terminal and the access network device, but a connection between the access network device and the core network device is maintained, and the terminal stores all or a part of information required for establishing/resuming a connection. Therefore, in the RRC_INACTIVE state, when the terminal needs to establish a connection, the terminal can quickly establish or resume an RRC connection with a network device based on the stored related information.

When the UE is in the RRC_CONNECTED state, links have been established between the UE and the base station and between the UE and the core network. When data arrives at a network, the data can be directly transmitted to the UE. When the UE is in the RRC_INACTIVE state, it indicates that links have been established between the UE and the base station and between the UE and the core network, but the link between the UE and the base station is released. However, the base station stores context of the UE. When data needs to be transmitted, the base station can quickly resume the link. When the UE is in the RRC_IDLE state, there is no link between the ULE and the base station and between the UE and the network. When data needs to be transmitted, links between the UE and the base station and between the UE and the core network need to be established.

Figure 4:
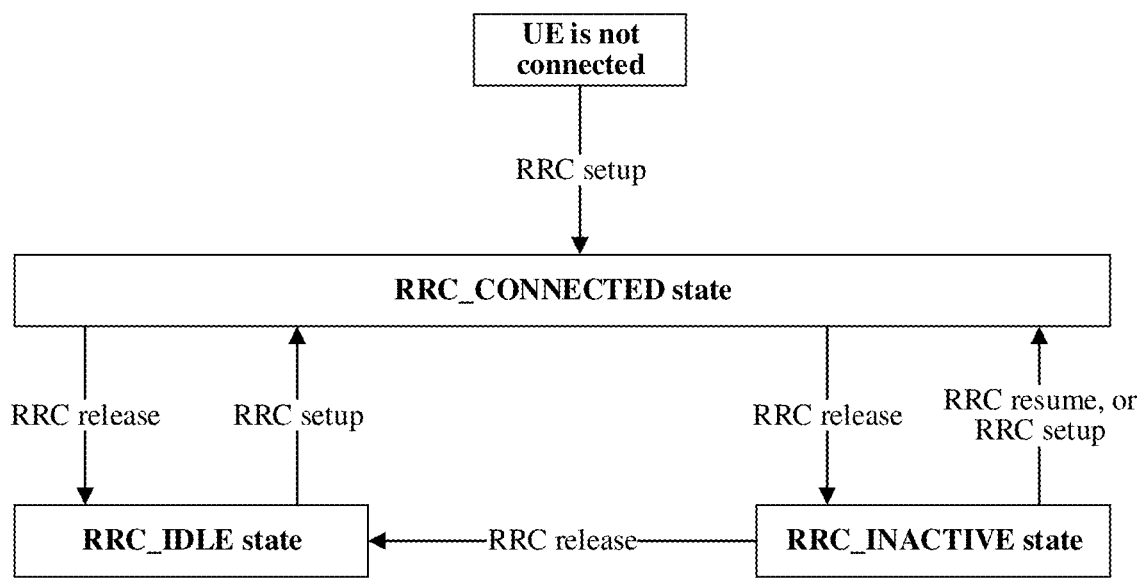
FIG. 4 is a schematic diagram of RRC state switching according to an embodiment of this application.

For example, FIG. 4 is a schematic diagram of RRC state switching according to an embodiment of this application. As shown in FIG. 4, in an RRC_IDLE state, UE can access a base station. In an access process or after accessing the base station, the UE can perform an RRC setup process with the base station, so that a status of the UE is switched from the RRC_IDLE state to an RRC_CONNECTED state. In the RRC_IDLE state, after the UE receives a paging message from the base station or is triggered by a higher layer of the UE, the UE can initiate the RRC setup process, to attempt to set up an RRC connection with the base station to enter the RRC_CONNECTED state. For example, the RRC setup process between the UE and the base station includes: The UE sends an RRC setup request (RRCSetupRequest) message to the base station; and after receiving the request, the base station sends an RRC setup (RRCSetup) message to the UE, so that the status of the UE can be switched to the RRC_CONNECTED state; or the base station sends an RRC reject (RRCReject) message to the UE, so that the UE continues to stay in the RRC_IDLE state. When the UE is in the RRC_IDLE state, there is no RRC connection between the UE and the base station. When the UE is in the RRC_CONNECTED state, the base station can change the status of the UE from the RRC_CONNECTED state to the RRC_IDLE state or the RRC_INACTIVE state in an RRC release process, for example, sending an RRC release (RRCRelease) message to the UE. When the UE is in the RRC_INACTIVE state, the UE can enter the RRC_IDLE state by releasing the RRC connection, or the UE can enter the RRC_CONNECTED state by resuming the RRC connection. For example, when the UE is in the RRC_CONNECTED state, there is an RRC connection between the UE and the base station. In this case, the base station knows that the UE is within a coverage of the base station or within a management range of the base station. The core network knows that the UE is within a coverage or a management range of a base station, and the core network knows that the UE can be located or found by using a base station. In the RRC_INACTIVE state, the UE can switch the status of the UE from the RRC_INACTIVE state to the RRC_CONNECTED state in an RRC setup or RRC resume (resume) process. The base station can switch the status of the UE from the RRC_INACTIVE state to the RRC_IDLE state in an RRC release process. In the RRC_INACTIVE state, after the UE receives the paging message from the base station or is triggered by the higher layer of the UE, the UE can initiate the RRC resume process, to attempt to resume the RRC connection with the base station to enter the RRC_CONNECTED state. For example, the RRC resume process between the UE and the base station includes: The UE sends an RRC resume request (RRCResumeRequest) message to the base station; and after receiving the request, the base station sends an RRC setup (RRCSetup) message or an RRC resume (RRCResume) message to the UE, so that the status of the UE can be switched to the RRC_CONNECTED state; or the base station sends an RRC release (RRCRelease) message to the UE, so that the status of the UE is switched from the RRC_INACTIVE state to the RRC_IDLE state; or the base station sends an RRC reject (RRCReject) message to the UE, so that the UE continues to stay in the RRC_INACTIVE state. When the UE is in the RRC_INACTIVE state, there is no RRC connection between the UE and the base station. In this case, the base station does not know whether the UE is within a coverage of the base station or within a management range of the base station. The core network knows that the UE is within a coverage or a management range of a base station, and the core network knows that the UE can be located or found by using a base station.

In a wireless network, one UE may communicate with a plurality of base stations, which is dual-connectivity (dual-connectivity, DC). In a new protocol, the dual connectivity is also referred to as multi-radio dual connectivity (multi-radio dual connectivity, MR-DC). The plurality of base stations may be base stations (for example, all the base stations are 4G base stations or are 5G base stations) that belong to a same radio access technology (radio access technology, RAT), or may be base stations (for example, one is a fourth generation 4G base station, and the other is a fifth generation 5G base station) of different RATs. A network side may provide a communication service for the UE by using resources of the plurality of base stations to provide high-rate transmission for the UE. In the DC, a base station that exchanges control plane signaling with a core network is referred to as a master node (master node, MN) or a master node, and another base station is referred to as a secondary node (secondary node, SN) or a secondary node. The base stations have different RLC/MAC entities. Data radio bearers (data radio bearers, DRBs) in the DC are divided into a master cell group (master cell group, MCG) bearer (bearer), a secondary cell group (secondary cell group, SCG) bearer, and a split bearer (split bearer). The MCG bearer means that an RLC/MAC entity of the DRB is on only the master node, the SCG bearer means that the RLC/MAC entity of the DRB is on only the secondary node, and the split bearer means that the RLC/MAC entity of the DRB is on each of the master node and the secondary node. A bearer whose PDCP is terminated on the MN is referred to as an MN terminated bearer. To be specific, downlink (downlink, DL) data is directly sent from the core network to the MN, processed through a PDCP/SDAP of the MN, and then sent to the UE through RLC/MAC, and uplink (uplink, UL) data is processed through the PDCP/SDAP of the MN, and then sent to the core network. Similarly, a bearer whose PDCP is terminated on the SN is referred to as an SN terminated bearer. To be specific, DL data is directly sent from the core network to the SN, processed through a PDCP/SDAP of the SN, and then sent to the UE through RLC/MAC, and UL data is processed through the PDCP/SDAP of the SN, and then sent to the core network. In addition, in the dual connectivity, both the master node and the secondary node have RRC entities, and both can generate RRC messages (that is, control messages, for example, measurement messages). In addition, the secondary node can directly send the RRC message generated by the secondary node to the UE (in this case, an RRC message sent by the UE to the secondary node is also directly sent to the secondary node). The RRC message between the secondary node and the UE is referred to as a signaling radio bearer (signaling radio bearer, SRB) 3. Alternatively, the RRC message generated by the secondary node may be notified to the master node, and then the master node sends the RRC message to the UE (in this case, the UE also forwards an RRC message that is sent to the secondary node to the secondary node through the master node, that is, the UE sends the RRC message to the master node, and then the master node forwards the message to the secondary node).

The MR-DC includes various DC such as an evolved universal terrestrial radio access and new radio dual connectivity (E-UTRA-NR dual connectivity, EN-DC) mode, a next generation radio access network evolved universal terrestrial radio access and new radio dual connectivity (NG-RAN E-UTRA-NR dual connectivity, NGEN-DC) mode, a new radio and evolved universal terrestrial radio access dual connectivity (NR-E-UTRA dual connectivity, NE-DC) mode, and a new radio and new radio dual connectivity (NR-NR dual connectivity, NR-DC) module.

In the EN-DC, the master node is an LTE base station eNB connected to a 4G core network evolved packet core (evolved packet core, EPC), and the secondary node is an NR base station.

In the NGEN-DC, the master node is an LTE base station NG-ENB connected to a 5G core network (5G core network, 5GC), and the secondary node is the NR base station.

In the NE-DC, the master node is the NR base station connected to the 5G core network 5GC, and the secondary node is the LTE base station.

In the NR-DC, the master node is the NR base station connected to the 5G core network 5GC, and the secondary node is the NR base station.

For UE in the MR-DC, a user plane of the secondary node may be connected to a core network connected to the master node (that is, the core network can directly send data to the UE by using the secondary node).

In the MR-DC, the master node has a primary cell, and the secondary node has a primary secondary cell. The primary cell is a cell that is deployed on a primary frequency and in which the UE initiates an initial connection establishment process or initiates a connection re-establishment process, or that is indicated as the primary cell in a handover process. The primary secondary cell is a cell in which the UE initiates a random access process on the secondary node, or a cell in which the UE skips a random access process and initiates data transmission in a secondary node change process, or a cell in which the UE initiates random access on a secondary node in a synchronous reconfiguration process.

The EN-DC is also referred to as non-standalone (non-standalone, NSA) networking sometimes. At a beginning phase of 5G, UE in an EN-DC network cannot camp on an NR cell, and an NR base station on which the UE can camp is also referred to as a standalone (standalone, SA) NR base station.

Because the UE can simultaneously receive services of a plurality of cells under a base station, a serving cell group provided by the MN for the UE may also be referred to as a master cell group, MCG for short. Similarly, a serving cell group provided by the SN for the UE is referred to as a secondary cell group, SCG for short. The MCG and the SCG each include at least one cell (cell). When there is only one cell in the MCG, the cell is a primary cell (primary cell) of the UE, that is, PCell. When there is only one cell in the SCG, the cell is a primary secondary cell (Primary Second Cell) of the UE, that is, PSCell. To normalize various terms in NR, the PCell and the PSCell are collectively referred to as a special cell (special cell), that is, SpCell. When there are a plurality of cells in the MCG or the SCG, a cell other than the SpCell is referred to as a secondary cell (secondary cell), that is, SCell. In this case, the SCell and the SpCell in each cell group perform carrier aggregation to jointly provide a transmission resource to the UE. The following describes some key terms in detail.

A carrier aggregation (Carrier Aggregation, CA) technology specifically refers to configuring a plurality of carriers (cells) for single UE to jointly perform data transmission.

Primary cell (primary cell, PCell): is a cell working on a primary carrier. The UE performs an initial connection establishment process or starts a connection re-establishment process in the cell. In a handover process, the cell is indicated as the primary cell.

Primary secondary cell (primary secondary cell, PSCell): is a cell in which the UE is indicated to perform random access or initial PUSCH transmission (for example, a random access process is omitted in an SCG change process) in the cell belonging to the SCG.

Secondary cell (secondary cell, SCell): is a cell working on a secondary carrier. Once an RRC connection is established, the secondary cell may be configured to provide additional radio resources.

Serving cell (serving cell): If the UE in the RRC_CONNECTED state is not configured with CA or DC and has only one serving cell, the serving cell is PCell; and if CA or DC is configured, a serving cell set includes PCell and SCells. Each CC (component carrier, component carrier) corresponds to an independent cell. For example, the UE configured with CA or DC is connected to one PCell and a maximum of 31 SCells. PCell and all SCells of the UE form a serving cell set of the UE. The serving cell may be PCell or SCell.

For some streaming-type services or voice services, for example, a streaming service (streaming service) and a multimedia telephony service for an IP multimedia system MTSI, only quality of a signal cannot reflect user experience of these services. Operators want to know user experience and optimize a network to improve user experience. This type of measurement collection is referred to as quality of experience QoE measurement collection (QoE measurement collection, QMC) or application layer measurement collection. This type of measurement is also initiated by using signaling-based MDT and management-based MDT. A base station receives measurement configuration information (which may be referred to as application layer measurement configuration information) from a CN, an OAM, or an EM. The configuration information may be sent to the base station through a transparent container, and the base station sends the configurations to UE by using an RRC message. After receiving application layer measurement results from an upper layer of the UE, an RRC layer of the UE sends the measurement results to the base station. For example, the measurement results are sent to the base station in an encapsulated form of a transparent container. In addition to the application layer measurement configuration information, the information received by the base station from the CN or the OAM or the EM may further include other QoE measurement information, for example, one or more of a QoE measurement region range and a QoE measurement service type, which are not described herein again. The QoE measurement service type may include QMC used for a streaming service, QMC used for an MTSI service, and the like. A method for a base station to select UE for performing QoE measurement is basically the same as a method for selecting UE in common MDT measurement. The base station sends a QoE measurement configuration to the UE by using an RRC reconfiguration message. For QoE measurement, the base station configures a signaling bearer (for example, an SRB4) for the UE to transmit a QoE measurement result (because a transmission priority of the QoE measurement result is generally lower than that of another SRB). The signaling bearer configured by the base station and the QoE measurement configured by the base station may be notified to the UE by using different RRC messages, or may be configured by using a same message. The measurement result of the UE may be sent by using the signaling bearer. Due to movement of the UE or a change of a wireless communication environment, the base station that delivers the QoE measurement related configuration to the UE may be different from the base station that receives the QoE measurement result sent by the UE.

Figure 5:
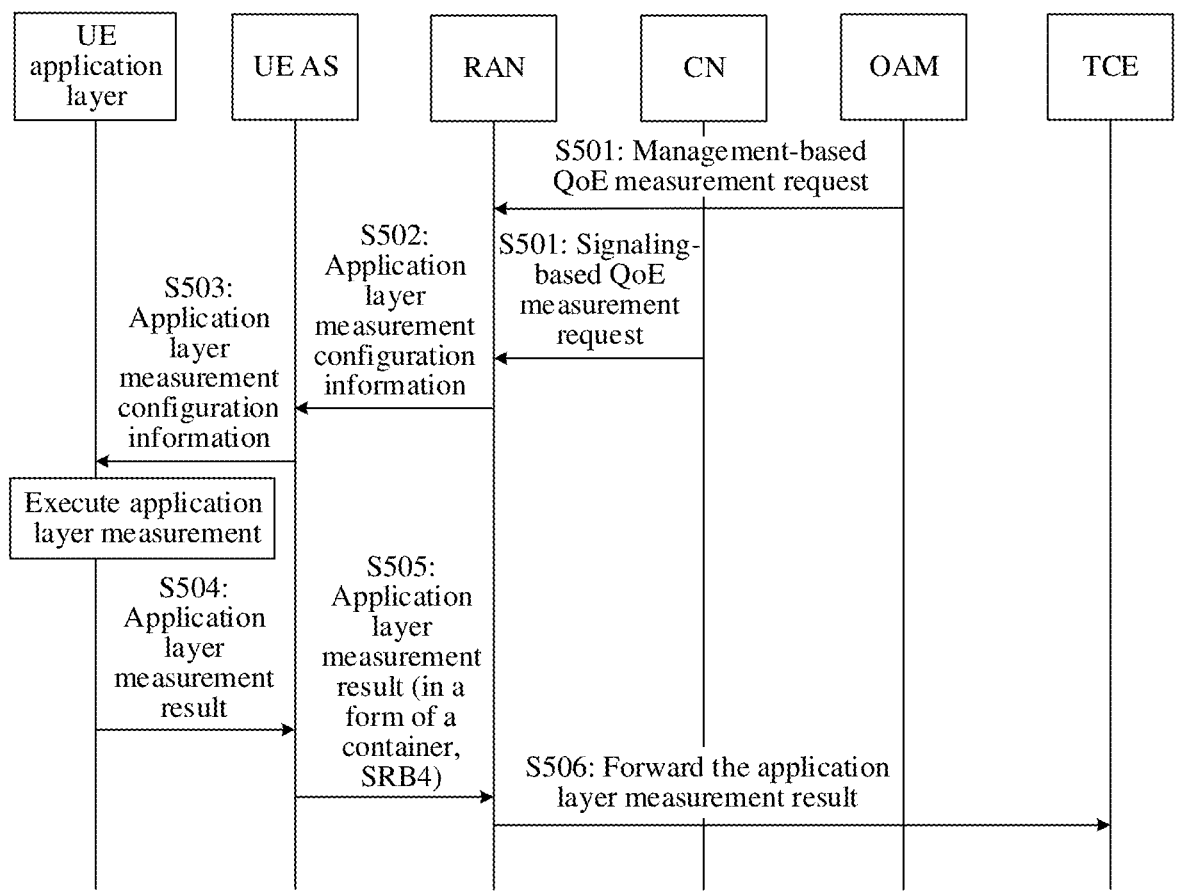
FIG. 5 is a schematic flowchart of QoE according to an embodiment of this application.

As shown in FIG. 5, a QoE process includes the following steps.

S501: An access network device (which may also be referred to as a radio access network RAN) obtains QoE measurement configuration information from a CN, an OAM, or an EM.

For signaling-based QoE measurement, the RAN obtains QoE measurement configuration information from the CN. The QoE measurement configuration information includes a container (container), and the container includes application layer measurement configuration information; or the QoE measurement configuration information includes application layer measurement configuration information in a form of a non-container. In embodiments of this application, the QoE measurement configuration information is QoE measurement-related configuration information that is sent by the CN/OAM/EM to the RAN. The application layer measurement configuration information refers to an application layer measurement configuration in the QoE measurement configuration information. The CN notifies QoE measurement configuration information for specific UE, for example, the QoE measurement configuration information is sent through an interface message between the RAN and the CN for specific UE.

For management-based QoE measurement, the RAN obtains QoE measurement configuration information from the OAM or the EM. The QoE measurement configuration information includes a container, and the container includes application layer measurement configuration information; or the QoE measurement configuration information includes application layer measurement configuration information in a form of a non-container. The CN notifies no QOE measurement configuration information for specific UE.

Optionally, the access network device can generate the application layer measurement configuration information based on a requirement of the access network device.

The application layer measurement configuration information is used for the UE to measure and report an application layer indicator, where the application layer indicator includes one or more of the following: an average throughput, an initial playback delay, a buffer delay, a playback delay, corruption duration, successive loss of packets, jitter duration, out-of-synchronization duration, round-trip time, and an average bit rate. For meanings of the indicators, definitions of the indicators in the conventional technology or the future technology may be considered, for example:

Average throughput: indicates a total quantity of bits received by an application layer of the UE within a measurement interval, for example, a total quantity of bits of a streaming media service received by the application layer.

Initial playback delay: indicates an initial playback delay when a streaming media starts to be displayed. For example, the initial playback delay may be specifically defined as from time of obtaining a first segment of the streaming media to time of extracting the streaming media from a buffer of a client.

Buffer level: indicates duration for which media data can still be played from current playback time.

Playback delay: indicates a playback delay when the streaming media is started. For example, the playback delay may be specifically defined as a delay when a dynamic adaptive streaming over Hypertext transfer protocol (Dynamic Adaptive Streaming over HTTP, DASH) player receives one of playback, back, or start to trigger media playback Corruption duration: indicates an interval between Nepal time (Nepal Time, NPT) corresponding to a last good frame before corruption and Nepal time corresponding to the first good frame after the corruption. A good frame is a completely received frame, where all parts of an image corresponding to the frame include correct content, or the frame is a refresh frame (that is, does not reference any previously decoded frames), or the frame only references previously decoded good frames.

Successive loss of packets: indicates a quantity of continuously lost real-time transport protocol (Real-time Transport Protocol, RTP) packets.

Jitter duration: duration of a jitter, where the jitter means that a difference between actual playback time and expected playback time of a frame exceeds a threshold. The expected playback time of the frame is equal to playback time of a last played frame plus (a difference between Nepal time of a current frame and Nepal time of the last played frame).

Out-of-synchronization duration: duration of out-of-synchronization, where out-of-synchronization means that an absolute time difference between a value A and a value B exceeds a threshold. The value A herein refers to a difference between playback time of a last played frame of a video stream and playback time of a last played frame of a voice stream. The value B herein refers to a difference between expected playback time of the last played frame of the video stream and expected playback time of the last played frame of the voice stream.

Round-trip time: indicates RTP-level round-trip time, plus an additional two-way delay due to buffering and other processing in a client (for example, from time when a receiver receives a voice frame to time when a voice of the receiver is converted into a voice frame, that is, a delay in a process of RTP level→loudspeaker→microphone→RTP level).

Average bit rate: indicates a bit rate for coding active media information within a measurement periodicity.

The meanings of the foregoing application layer indicators are from a clause 16.2 in v16.2.0 in 3GPP TS 26.114. In an actual design, reference may be made to other existing indicators or future measurement indicators.

S502: The RAN sends the application layer measurement configuration information to UE.

For signaling-based QoE measurement, the RAN sends the application layer measurement configuration information to corresponding UE. The RAN also determines, depending on whether the UE supports QoE measurement, whether to configure QoE measurement for the UE.

For management-based QoE measurement, the RAN selects appropriate UE to perform QoE measurement based on a QoE measurement configuration sent by the OAM/EM, whether the UE supports corresponding QoE measurement, and other factors. After selecting the UE, the RAN sends the application layer measurement configuration information to the UE.

The RAN sends, by using an RRC message, the application layer measurement configuration information obtained from the CN, the OAM, or the EM to the UE, where the message may also carry a service type corresponding to the application layer measurement configuration information. The application layer measurement configuration information is sent to the UE in a form of a container.

S503: An access stratum (access stratum, AS) of the UE sends, to an upper layer of the AS of the UE, the application layer measurement configuration information received from the RAN.

It should be noted that, the access stratum of the UE is a function layer for communication between the UE and the RAN, that is, the access network device. For example, the access stratum may include at least one of an RRC layer, a PDCP layer, an SDAP layer, an RLC layer, a MAC layer, and a PHY layer. For example, the RRC layer of the UE may receive the application layer measurement configuration information from the RAN, and send the application layer measurement configuration information to an upper layer of the RRC layer of the UE.

The upper layer of the AS of the UE may be an application layer, or may be a layer for performing QoE measurement. In embodiments of this application, an example in which the upper layer of the AS is an application layer is used for description. When the upper layer of the AS is another protocol layer, the method provided in embodiments of this application is also applicable, but corresponding measurement configuration and measurement are changed to measurement configuration and measurement corresponding to the upper layer of the AS.

The AS of the UE sends the application layer measurement configuration information and the service type to the upper layer of the AS of the UE.

The upper layer of the AS of the UE performs QoE measurement based on the application layer measurement configuration information.

The AS of the UE mainly refers to the RRC layer of the UE.

S504: The upper layer of the AS of the UE sends an application layer measurement result to the AS of the UE.

The upper layer of the AS of the UE reports an application layer measurement result according to a specific rule, for example, a reporting rule included in the application layer measurement configuration information. For example, the upper layer of the AS of the UE periodically reports the application layer measurement result, and/or the UE may report the application layer measurement result after a session ends.

When the upper layer of the AS of the UE needs to report the application layer measurement result based on the application layer measurement configuration information, the upper layer of the AS of the UE sends the application layer measurement result to the AS of the UE, and the upper layer of the AS of the UE also indicates a service type corresponding to the QoE measurement result.

S505: The AS of the UE sends the application layer measurement result to the RAN.

The AS of the UE sends the application layer measurement result and the service type corresponding to the measurement result to the RAN. For example, an uplink RRC message carries the application layer measurement result and the service type corresponding to the measurement result. The application layer measurement result may alternatively be sent to the RAN in a form of a container.

Due to movement of the UE or a change of a wireless network environment, the RAN that delivers the application layer measurement configuration information and the RAN that receives the application layer measurement result may be different base stations, or may be a same base station.

S506: The RAN sends the application layer measurement result to a trace collection entity TCE.

The RAN sends the application layer measurement result to a TCE.

When studying QoE measurement, the inventor of this application finds that in some scenarios, for example, a state transition of UE, or a change of a RAN caused by movement of the UE and/or a change of a wireless communication environment, a condition for retaining or clearing an application layer measurement configuration is unclear, which increases additional application layer measurement configuration signaling overheads or causes an inaccurate application layer measurement result for a service, or occupies additional UE application layer overheads.

In this application, retaining the application layer measurement configuration may also be described as restoring the application layer measurement configuration, or continuing previous QoE measurement, and deleting the application layer measurement configuration may be described as clearing the application layer measurement configuration, or releasing the application layer measurement configuration, or not retaining or restoring the application layer measurement configuration, or not continuing previous QoE measurement, or the like. The application layer measurement configuration may also be described as application layer measurement configuration information.

Some scenarios mentioned above may include the following four types.

(1) When UE is in an RRC_INACTIVE state, the UE stores configuration information, for example, a cell radio network temporary identifier (cell radio network temporary identifier, C-RNTI) of the UE, received from a network side in UE inactive access stratum context (UE inactive AS context), where an application layer measurement configuration received from the network side may be kept at an AS layer and/or an application layer. However, when the UE is resumed from RRC_INACTIVE to RRC_CONNECTED, in some scenarios, the UE can release a previous application layer measurement configuration. For example, for management-based QoE measurement, a new base station may not receive a QoE measurement configuration from a network management system, for example, an OAM or an EM. In this case, the UE can release the previous application layer measurement configuration. In some scenarios, the UE can retain the application layer measurement configuration. For example, the new base station receives the QoE measurement configuration from the network management system. In this case, the UE can continue previous QoE measurement, and the new base station does not need to send the application layer measurement configuration to the UE again. It can be learned that, for whether to retain the application layer measurement configuration, if the UE uses a default manner, regardless of whether the default manner is retaining or deletion, a case in which a behavior of the UE does not match a requirement of the base station may occur. In this case, additional application layer measurement configuration signaling overheads or additional application layer storage overheads of the UE may be caused. In addition, optionally, when the UE is in an RRC_INACTIVE state, the UE may also receive a service, for example, a broadcast service. In this case, because the UE does not know a relationship between the old application layer measurement configuration and a newly delivered application layer measurement configuration, the UE does not associate a QoE measurement result for a retained or released application layer measurement configuration with a QoE measurement result for the QoE measurement configuration received from the new base station, that is, the base station connected to the UE after is resumed from the RRC_INACTIVE to the RRC_CONNECTED. As a result, the QoE measurement result cannot reflect a real QoE measurement result of UE for a service, that is, the QoE measurement result is not a measurement result corresponding to one service from the beginning to the end, resulting in an inaccurate QoE measurement result.

(2) When the network side sends a full configuration (full configuration) indication to the UE, the AS layer of the UE releases the previously configured application layer measurement configuration, and the network side needs to re-deliver an application layer measurement configuration to the UE, which increases signaling overheads. In addition, the newly delivered application layer measurement configuration is equivalent to a new configuration for the UE, and the application layer of the UE starts QoE measurement again. In this way, the QoE measurement result for the released application layer measurement configuration and a QoE measurement result for the newly delivered application layer measurement configuration cannot be associated together, and a real QoE measurement result of UE for a service cannot be reflected, that is, the QoE measurement result is not a measurement result corresponding to a service from the beginning to the end, resulting in an inaccurate QoE measurement result. The full configuration means that the network side notifies the UE to re-initialize a radio configuration, that is, a currently delivered radio configuration is independent of the radio configuration previously delivered by the network side to the UE. For example, in a handover scenario, a target base station, for example, a target master node in an MR-DC scenario, or a target serving base station in a non-MR-DC scenario, does not support a source base station, for example, a source master node in the MR-DC scenario, or a source serving base station in the non-MR-DC scenario, and when configuring an RRC protocol version for the UE, the target base station cannot understand content configured by the source base station for the UE. In this case, the target base station sends a full configuration indication to the UE. In addition, even if the UE does not release the application layer measurement configuration, after the UE receives the newly delivered application layer measurement configuration, because the UE does not know a relationship between the old application layer measurement configuration and the newly delivered application layer measurement configuration, the UE does not associate a QoE measurement result of the old application layer measurement configuration that is not released with a QoE measurement result of the newly delivered application layer measurement configuration. As a result, a real QoE measurement result of one UE for one service cannot be reflected, that is, the QoE measurement result is not a measurement result corresponding to one service from the beginning to the end, resulting in an inaccurate QoE measurement result.

(3) For MR-DC, when an MN notifies the UE to release an SCG configuration of an SN, the UE releases an SCG configuration previously configured by the SN for the UE. In this way, if the SN previously configures an application layer measurement configuration for the UE, for example, the application layer measurement configuration is carried in the SCG configuration, the UE also releases the corresponding application layer measurement configuration. However, a corresponding service is migrated to the MCG to continue execution. In this case, if the MCG re-delivers an application layer measurement configuration for the service, a QoE measurement result of the service is divided into two parts. Worse, a measurement result of the released application layer measurement configuration may not be reported, for example, the measurement result is reported when the service ends. In this way, the application layer measurement configuration overheads are increased. In addition, the QoE measurement result is inaccurate. In addition, even if the UE does not release the application layer measurement configuration, after the UE receives the newly delivered application layer measurement configuration, because the UE does not know a relationship between the old application layer measurement configuration and the newly delivered application layer measurement configuration, the UE does not associate a QoE measurement result of the old application layer measurement configuration that is not released with a QoE measurement result of the newly delivered application layer measurement configuration, or does not report a QoE measurement result of the old application layer measurement configuration that is not released. As a result, a real QoE measurement result of one UE for one service cannot be reflected, that is, the QoE measurement result is not a measurement result corresponding to one service from the beginning to the end, resulting in an inaccurate QoE measurement result.

(4) For the MR-DC, when the network side sends an MR-DC release and add (MR-DC release and add) indication to the UE, the AS layer of the UE releases the previously configured application layer measurement configuration, and the network side needs to re-deliver an application layer measurement configuration to the UE, which increases signaling overheads. In addition, the newly delivered application layer measurement configuration is a new configuration for the UE, and the application layer of the UE starts QoE measurement again. In this way, the QoE measurement result for the released application layer measurement configuration and a QoE measurement result for the newly delivered application layer measurement configuration cannot be associated together, and a real QoE measurement result of UE for a service cannot be reflected, that is, the QoE measurement result is not a measurement result corresponding to a service from the beginning to the end. Worse, a measurement result of the released application layer measurement configuration may not be reported, for example, the measurement result is reported when the service ends. In this way, the application layer measurement configuration overheads are increased. In addition, the QoE measurement result is inaccurate. The MR-DC release and add indication means that the network side indicates the UE to release a current SCG configuration and add a new SCG configuration. For example, when the SN changes, and a target secondary node does not support an RRC protocol version configured by a source secondary node for the UE, the target secondary node cannot understand content configured by the source secondary node for the UE. In this case, the target secondary node notifies a master node to use the MR-DC release and add. After receiving the notification, the master node sends an MR-DC release and add indication to the UE. In addition, even if the UE does not release the application layer measurement configuration, after the UE receives the newly delivered application layer measurement configuration, because the UE does not know a relationship between the old application layer measurement configuration and the newly delivered application layer measurement configuration, the UE does not associate a QoE measurement result of the old application layer measurement configuration that is not released with a QoE measurement result of the newly delivered application layer measurement configuration, or does not report a QoE measurement result of the old application layer measurement configuration that is not released. As a result, a real QoE measurement result of one UE for one service cannot be reflected, that is, the QoE measurement result is not a measurement result corresponding to one service from the beginning to the end, resulting in an inaccurate QoE measurement result.

In view of the above problems, embodiments of this application provide a communication method, specifically, an application layer measurement configuration method, to avoid a case in which a behavior of UE is inconsistent with a requirement of a base station for application layer measurement configuration, to avoid unnecessary overheads, for example, storage overheads or signaling overheads, of application layer measurement configuration, or a problem that a QoE measurement result is inaccurate.

Figure 6:
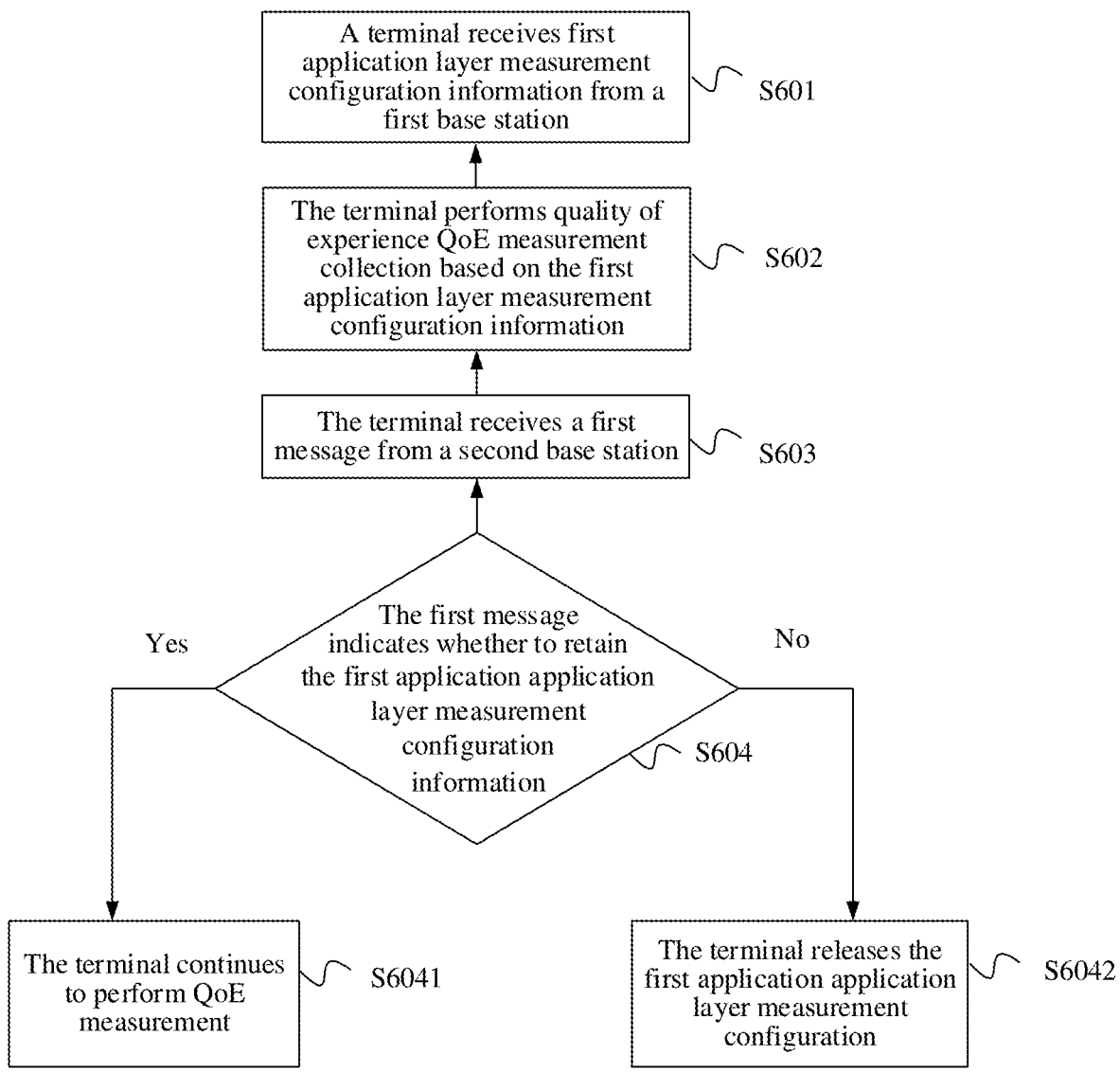
FIG. 6 is a schematic flowchart of a communication method according to an embodiment of this application.

FIG. 6 is a schematic flowchart of a communication method according to an embodiment of this application. The method includes the following steps.

S601: A terminal receives first application layer measurement configuration information from a first base station.

Specifically, an AS of the terminal receives the first application layer measurement configuration information from the first base station, where the first application layer measurement configuration information may be included in QoE measurement collection (QMC) configuration information. Specifically, the first application layer measurement configuration information may be included in the QMC configuration information in a form of a container or a form of a non-container. The QMC configuration information belongs to a QoE configuration. Optionally, the terminal may further receive, from the first base station, information indicating a service type corresponding to the first application layer measurement configuration information. Optionally, the information indicating the service type corresponding to the first application layer measurement configuration information may be included in the QMC configuration information. In embodiments of this application, QoE measurement may include application layer measurement. The first application layer measurement configuration information includes configuration information required by the terminal to perform application layer measurement, and may also be referred to as a first application layer measurement configuration for short.

The AS of the terminal forwards the received first application layer measurement configuration information to an upper layer, for example, an application layer, of the AS of the terminal.

Specifically, the first application layer measurement configuration information may be one of a plurality of pieces of application layer measurement configuration information. Different application layer measurement configuration information corresponds to different service types, or the application layer measurement configuration information is in a one-to-many correspondence to the service types.

Optionally, the terminal may further receive, from the first base station, an application layer measurement configuration identifier indicating the first application layer measurement configuration information. The application layer measurement configuration identifier indicates the application layer measurement configuration information. For example, when a network side (for example, the first base station) subsequently needs to release the first application layer measurement configuration information, the network side needs to deliver only one release command to UE, where the release command carries the application layer measurement configuration identifier of the first application layer measurement configuration information, and the UE can learn, based on the application layer measurement configuration identifier of the first application layer measurement configuration information, which application layer measurement configuration information is to be released. The application layer measurement configuration identifier may also be referred to as a QoE measurement configuration identifier.

S602: The terminal performs quality of experience QoE measurement based on the first application layer measurement configuration information.

Specifically, the upper layer, for example, the application layer, of the AS of the terminal performs QoE measurement based on the received first application layer measurement configuration information.

For S601 and S602, refer to the corresponding descriptions in FIG. 5. Details are not described herein again.

S603: The terminal receives a first message from a second base station, where the first message indicates whether to retain the first application layer measurement configuration information.

Optionally, the terminal may further receive, from the second base station, the information indicating the service type corresponding to the first application layer measurement configuration information. Optionally, the information indicating the service type corresponding to the first application layer measurement configuration information may be carried in the first message, or may be carried in another message other than the first message.

Optionally, that the first message indicates whether to retain the first application layer measurement configuration information may be implemented depending on whether the first message carries the application layer measurement configuration identifier indicating the first application layer measurement configuration information. For example, if the first message carries the application layer measurement configuration identifier indicating the first application layer measurement configuration information, it indicates to retain the first application layer measurement configuration information; and if the first message does not carry the application layer measurement configuration identifier indicating the first application layer measurement configuration information, it indicates to not retain the first application layer measurement configuration information.

It may be understood that the first base station and the second base station may be a same base station, or may be different base stations.

S604: The terminal determines, based on the first message, whether to retain the first application layer measurement configuration information, and performs the following step S6041 or step S6042.

S6041: Continue to perform QoE measurement when the first message indicates to retain the first application layer measurement configuration information.

S6042: Release the first application layer measurement configuration information when the first message indicates to not retain the first application layer measurement configuration information.

The first message may be a message indicating RRC resume. Optionally, the message indicating the radio resource control RRC resume indicates the terminal to enter a radio resource control connected RRC_CONNECTED state from a radio resource control inactive RRC_INACTIVE state.

Alternatively, the first message may be a message indicating a full configuration. Optionally, the message indicating the full configuration may be an RRC reconfiguration message. For example, the RRC reconfiguration message includes a full configuration indication.

Alternatively, the first message may be a message indicating multi-radio dual connectivity MR-DC release and/or add. Optionally, the first message may be an RRC reconfiguration message. For example, the RRC reconfiguration message includes an MR-DC release and add indication.

Alternatively, the first message may be a message indicating release of a secondary cell group SCG configuration. Optionally, the first message may be an RRC reconfiguration message. For example, the RRC reconfiguration message includes an SCG configuration release indication.

That the first message indicates whether to retain the first application layer measurement configuration information may specifically include:

The first message includes a first indication information field, and the first indication information may be a Boolean variable and has two values. One value indicates to retain the first application layer measurement configuration information, and the other value indicates to not retain the first application layer measurement configuration information. Alternatively, the first indication information field has only one value. When the first indication information field is received, for example, when the first message includes the first indication information field, that is, when the first indication information field is valid, it indicates to retain the first application layer measurement configuration information; otherwise, when the first message does not include the first indication information field, that is, when the first indication information field is invalid, it indicates to not retain the first application layer measurement configuration information. Conversely, when the first indication information field is received, for example, when the first message includes the first indication information field, it indicates to not retain the first application layer measurement configuration information; otherwise, when the first message does not include the first indication information field, it indicates to retain the first application layer measurement configuration information. Optionally, the first message may further include the application layer measurement configuration identifier indicating the first application layer measurement configuration information. In this way, the terminal can learn, based on the application layer measurement configuration identifier, which application layer measurement configuration information is to be retained or deleted. Optionally, there may be a plurality of application layer measurement configuration identifiers included in the first message, and the plurality of application layer measurement configuration identifiers respectively correspond to different application layer measurement configuration information.

Alternatively, that the first message indicates whether to retain the first application layer measurement configuration information may specifically include:

If the first message includes the application layer measurement configuration identifier of the first application layer measurement configuration information, it indicates to retain the first application layer measurement configuration information; and/or if the first message does not include the application layer measurement configuration identifier of the first application layer measurement configuration information, it indicates to delete the first application layer measurement configuration information. Alternatively, if the first message includes the application layer measurement configuration identifier of the first application layer measurement configuration information, it indicates to delete the first application layer measurement configuration information; and/or if the first message does not include the application layer measurement configuration identifier of the first application layer measurement configuration information, it indicates to retain the first application layer measurement configuration information. Optionally, there may be a plurality of application layer measurement configuration identifiers included in the first message, and the plurality of application layer measurement configuration identifiers respectively correspond to different application layer measurement configuration information. For example, the first message includes a release list, where the release list includes a plurality of application layer measurement configuration identifiers; or the first message includes a retain list, where the retain list includes a plurality of application layer measurement configuration identifiers.

Alternatively, that the first message indicates whether to retain the first application layer measurement configuration information may specifically include:

The first message includes second application layer measurement configuration information and a first indication information field, and the first indication information field indicates whether the second application layer measurement configuration information is new application layer measurement configuration information. Whether the second application layer measurement configuration information is new application layer measurement configuration information may also be understood as whether the first base station sends the second application layer measurement configuration information to the terminal or whether the terminal device receives the second application layer measurement configuration information before S603, that is, whether the second application layer measurement configuration information is the same as the first application layer measurement configuration information. It may be understood that the second application layer measurement configuration information may be the same as or different from the first application layer measurement configuration information. That the second application layer measurement configuration information is the same as the first application layer measurement configuration information means that the second application layer measurement configuration information is not new application layer measurement configuration information, that is, the second application layer measurement configuration information is old application layer measurement configuration information. That the second application layer measurement configuration information is different from the first application layer measurement configuration information means that the second application layer measurement configuration information is new application layer measurement configuration information. When the second application layer measurement configuration information is old application layer measurement configuration information, that is, when the second application layer measurement configuration information is the same as the first application layer measurement configuration information, it means that the first application layer measurement configuration information is to be retained. The first indication information field may be a Boolean variable and has two values. One value indicates that the second application layer measurement configuration information is new application layer measurement configuration information, and the other value indicates that the second application layer measurement configuration information is not new application layer measurement configuration information. Alternatively, the first indication information field has only one indication value. When the first indication information field is received, for example, when the first message includes the first indication information field, that is, when the first indication information field is valid, it indicates that the second application layer measurement configuration information is new application layer measurement configuration information; otherwise, when the first message does not include the first indication information field, that is, when the first indication information field is invalid, it indicates that the second application layer measurement configuration information is not new application layer measurement configuration information. Conversely, when the first indication information field is received, for example, when the first message includes the first indication information field, it indicates that the second application layer measurement configuration information is old application layer measurement configuration information; otherwise, when the first message does not include the first indication information field, it indicates that the second application layer measurement configuration information is new application layer measurement configuration information. When the second application layer measurement configuration information is new application layer measurement configuration information, the AS of the terminal forwards the received second application layer measurement configuration information to the upper layer of the AS of the terminal. When the second application layer measurement configuration information is old application layer measurement configuration information, the AS of the terminal may not forward the received second application layer measurement configuration information to the upper layer of the AS of the terminal. Further, optionally, when all the application layer measurement configuration information carried in the first message is new application layer measurement configuration information, that is, when the first application layer measurement configuration information is not carried, the terminal determines to not retain the first application layer measurement configuration information. In this case, the AS of the terminal sends, to the upper layer of the AS of the terminal, an indication of releasing the first application layer measurement configuration information. Further, optionally, the AS of the terminal sends, to the upper layer of the AS of the terminal, an application layer measurement configuration identifier indicating the first application layer measurement configuration information, to indicate which piece of application layer measurement configuration information is to be released. Optionally, the first message may further include an application layer measurement configuration identifier indicating the second application layer measurement configuration information. Alternatively, the first indication information field may be an application layer measurement configuration identifier of the second application layer measurement configuration information. When the application layer measurement configuration identifier of the second application layer measurement configuration information is the same as the application layer measurement configuration identifier of the first application layer measurement configuration information, it indicates that the second application layer measurement configuration information is old application layer measurement configuration information; otherwise, when the application layer measurement configuration identifier of the second application layer measurement configuration information is different from application layer measurement configuration identifiers of all the application layer measurement configuration information stored by the terminal before S603, it indicates that the second application layer measurement configuration information is new application layer measurement configuration information.

Alternatively, that the first message indicates whether to retain the first application layer measurement configuration information may specifically include:

The first message includes second application layer measurement configuration information. The AS layer of the terminal compares the application layer measurement configuration information received before S603 with the second application layer measurement configuration information. If the second application layer measurement configuration information belongs to the application layer measurement configuration information received before S603 (that is, the terminal has received the second application layer measurement configuration information before S603), it is considered that the second application layer measurement configuration information is new application layer measurement configuration information. Otherwise, it is considered that the second application layer measurement configuration information is old application layer measurement configuration information. For example, that the second application layer measurement configuration information may be the same as the first application layer measurement configuration information means that the second application layer measurement configuration information is old application layer measurement configuration information. When the second application layer measurement configuration information is an old application layer measurement configuration information, it means that the second application layer measurement configuration information is to be retained. When the second application layer measurement configuration information is new application layer measurement configuration information, the AS of the terminal forwards the received second application layer measurement configuration information to the upper layer of the AS of the terminal. When the second application layer measurement configuration information is old application layer measurement configuration information, the AS of the terminal does not forward the received second application layer measurement configuration information to the upper layer of the AS of the terminal. Further, optionally, when the second application layer measurement configuration information is new application layer measurement configuration information, that is, when the second application layer measurement configuration information is different from the previously received first application layer measurement configuration information, the terminal can determine to not retain the previously received first application layer measurement configuration information. That is, the second application layer measurement configuration information is new application layer measurement configuration information, to indicate to not retain that the previously received first application layer measurement configuration information.

It may be understood that the first message includes the second application layer measurement configuration information and the first indication information field, or the first message includes the second application layer measurement configuration information. The two specific methods for indicating whether to retain the first application layer measurement configuration information may be applied to the following scenarios:

The first message carries a full configuration indication. After the terminal receives the first message, the AS of the terminal releases all the application layer measurement configuration information, but the AS of the terminal does not send, to the upper layer of the AS of the terminal, an indication of releasing all the application layer measurement configuration information. Therefore, the upper layer of the AS of the terminal still retains the application layer measurement configuration information. The first message may further carry application layer measurement configuration information that needs to be retained, that is, the first message includes the application layer measurement configuration information (for example, the second application layer measurement configuration information that is the same as the previously configured first application layer measurement configuration information). Therefore, measurement corresponding to the application layer measurement configuration information may be continued, and the AS layer of the terminal can obtain the application layer measurement configuration information. In this way, a radio configuration in the application layer measurement configuration information obtained by the AS layer of the terminal may be aligned with the application layer measurement configuration information in the upper layer of the AS layer of the terminal.

Alternatively, that the first message indicates whether to retain the first application layer measurement configuration information may specifically include:

The first message indicates a service type of a first application layer measurement configuration that is to be retained or released, where the service type corresponds to the first application layer measurement configuration that is to be retained or released.

A specific manner in which the first message indicates the service type of the first application layer measurement configuration that is to be retained or released may include:

The first message includes a first indication information field. The first indication information field may be a bitmap and has a bit or a bit group corresponding to each service type. A value of each bit or bit group may indicate whether an application layer measurement configuration corresponding to the service type is to be retained. Alternatively, the first indication information field indicates only a service type that is to be retained or released. When the first indication information field is received, for example, when the first message includes the first indication information field, that is, when the first indication information field is valid, it indicates that a service type of application layer measurement configuration information that is to be retained or released may be one or more service types.

It may be understood that, when the UE receives the first indication information field, it indicates that the UE needs to retain the first application layer measurement configuration, and when the UE does not receive the first indication information field, it indicates that the UE does not retain the first application layer measurement configuration. This is equivalent to that the UE does not retain, that is, releases, the first application layer measurement configuration by default. Alternatively, when the UE receives the first indication information field, it indicates that the UE is to release the first application layer measurement configuration, and when the UE does not receive the first indication information field, it indicates that the UE is to retain the first application layer measurement configuration. This is equivalent to that the UE retains the first application layer measurement configuration by default.

For example, when the application layer measurement configuration information on the terminal includes only the first application layer measurement configuration information, the first indication information field may indicate, through one bit (which may be more than one bit), whether to retain the first application layer measurement configuration. For example, 1 indicates to retain the first application layer measurement configuration, and 0 indicates to release the first application layer measurement configuration. Alternatively, if the first indication information field is valid (or exists), it indicates to retain the first application layer measurement configuration, and if the first indication information field is invalid (or does not exist), it indicates to release the first application layer measurement configuration. Alternatively, if the first indication information field is valid (or exists), it indicates to release the first application layer measurement configuration, and if the first indication information field is invalid (or does not exist), it indicates to retain the first application layer measurement configuration.

When the application layer measurement configuration information on the terminal includes a plurality of pieces of application layer measurement configuration information, retaining or release of each piece of application layer measurement configuration information may be indicated by using a corresponding first indication information field, for example, indicated in a bitmap manner, or the first indication information field is an identifier or identifiers of one or more application layer measurement configurations that are to be retained, or an identifier or identifiers of one or more application layer measurement configurations to be deleted.

Alternatively, when application layer measurement configuration information is to be retained or released for a service type corresponding to the application layer measurement configuration information, and/or when the terminal may have application layer measurement configurations of one or more service types, but each service type corresponds to only one application layer measurement configuration, a service type may be indicated to indicate that an application layer measurement configuration corresponding to the service type needs to be retained or released, or an application layer measurement configuration that is to be retained or released may be indicated, and a service type corresponding to the application layer measurement configuration is also indicated.

Alternatively, when the terminal has application layer measurement configurations of one or more service types, and each service type corresponds to one or more application layer measurement configurations, an application layer measurement configuration that is to be retained or released may be indicated, for example, indicated by using an identifier of the application layer measurement configuration, and a service type corresponding to the application layer measurement configuration may also be indicated. Alternatively, when identifiers of application layer measurement configurations corresponding to different service types are different, an application layer measurement configuration that is to be retained or released may be indicated, for example, indicated by using an identifier of the application layer measurement configuration, without indicating a service type corresponding to the application layer measurement configuration.

A specific indication manner is one of the foregoing provided indication manners. After a protocol is determined, both the base station and the terminal know the specific indication manner. Alternatively, if a specific indication manner is more of the foregoing provided indication manners, the specific indication manner may be notified by the base station to the terminal.

After S6041, the method may further include:

The terminal reports a measurement result obtained by performing application layer measurement based on the first application layer measurement configuration information. For a specific reporting process, refer to the description in FIG. 5. Details are not described herein again.

By using the application layer measurement configuration method provided in this embodiment, a case in which a behavior of UE is inconsistent with a requirement of a base station for application layer measurement configuration can be avoided, to avoid unnecessary overheads, for example, storage overheads or signaling overheads, of application layer measurement configuration, or a problem that a QoE measurement result is inaccurate. The following describes in detail the communication method provided in embodiments of this application with reference to the foregoing four specific application scenarios and the method shown in FIG. 6.

Scenario 1: UE is Switched from an RRC_INACTIVE State to an RRC_CONNECTED State

Figure 7:
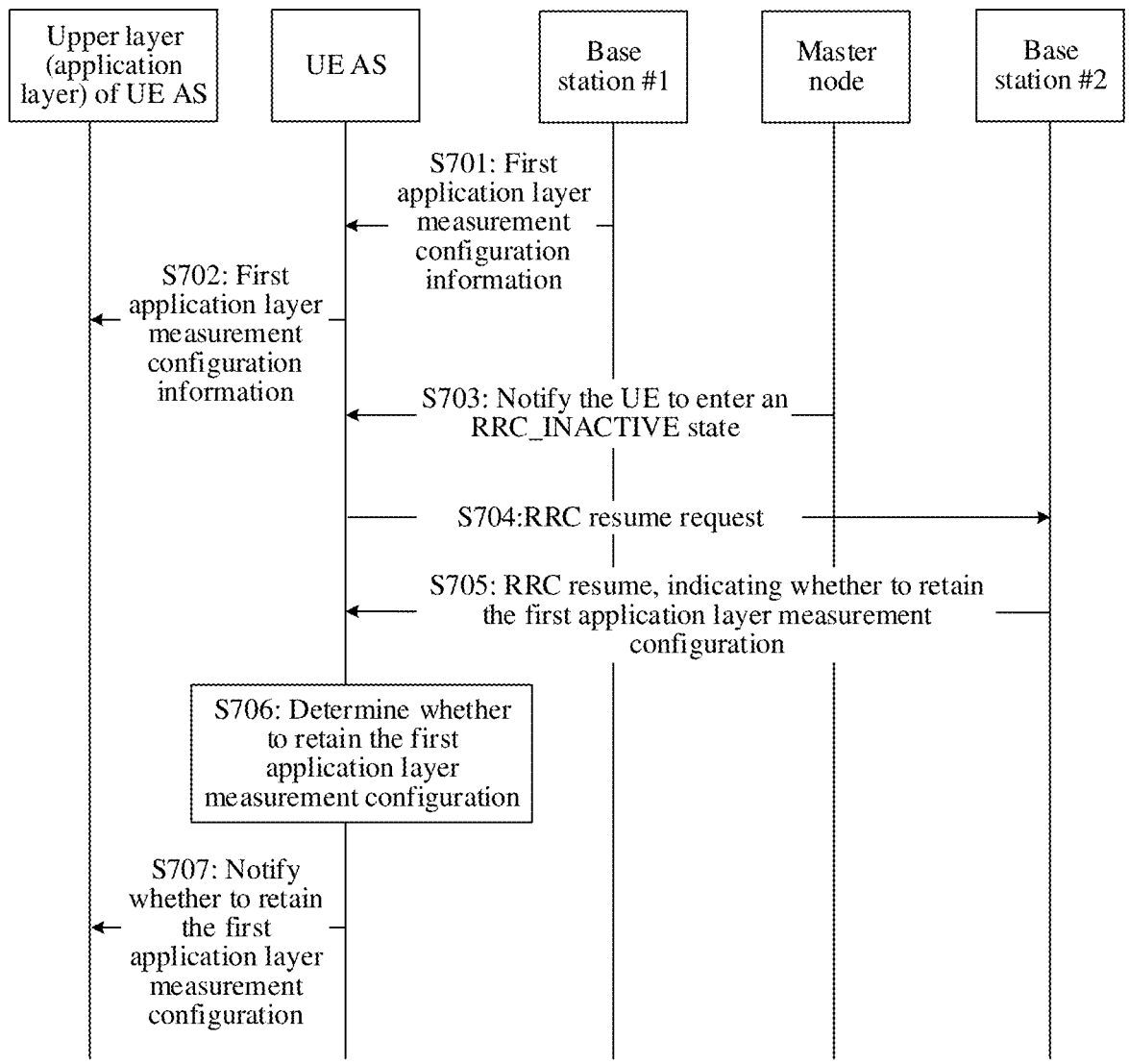
FIG. 7 is a schematic flowchart of a communication method according to an embodiment of this application.

FIG. 7 is a schematic flowchart of a communication method when UE is switched from an RRC_INACTIVE state to an RRC_CONNECTED state according to an embodiment of this application.

The communication method includes the following steps.

S701: A base station #1 sends first application layer measurement configuration information to UE.

Before S701, the base station #1 can obtain QoE measurement configuration information from a CN, an OAM, or an EM, so that the base station #1 obtains the first application layer measurement configuration information. Alternatively, the base station #1 generates the first application layer measurement configuration information based on a requirement of the base station #1.

The base station #1 sends a service type corresponding to the first application layer measurement configuration information to the UE.

S702: An AS of the UE sends the first application layer measurement configuration information received from the base station #1 to an upper layer of the AS of the UE.

For S701 and S702, refer to the corresponding descriptions in FIG. 5 and FIG. 6. Details are not described herein again.

S703: A network side notifies the UE to enter an RRC_INACTIVE state.

When the UE is in a non-MR-DC scenario, a serving base station notifies the UE to enter an RRC_INACTIVE state. The serving base station may be the base station #1, or may be another base station that serves as a serving base station of the UE.

When the UE is in an MR-DC scenario, a master node notifies the UE to enter the RRC_INACTIVE state. The master node may be the base station #1, or may be another base station serving as a master node.

That is, the base station that sends the first application layer measurement configuration information and the base station that notifies the UE to enter the RRC_INACTIVE state may be a same base station, or may be different base stations.

Optionally, the network side notifies, by using an RRC release message, the UE to enter the RRC_INACTIVE state.

Optionally, after entering the RRC_INACTIVE state, the AS of the UE retains a first application layer measurement configuration. Specifically, a manner in which the AS retains the first application layer measurement configuration includes: Manner 1: The AS continues to store specific content in the first application layer measurement configuration; or Manner 2: The AS stores state information that the UE already has the first application layer measurement configuration and a service type corresponding to the first application layer measurement configuration. In Manner 1, the upper layer of the AS of the UE may not retain the first application layer measurement configuration, or retain the first application layer measurement configuration and the corresponding service type. When the first application layer measurement configuration is not to be retained, the AS of the UE can notify the upper layer of the AS to release the first application layer measurement configuration or to suspend QoE measurement, and the upper layer of the AS of the UE releases the first application layer measurement configuration when receiving the notification of suspending the QoE measurement. In Manner 2, the upper layer of the AS of the UE continues to store the specific content in the first application layer measurement configuration.

Optionally, when the network side notifies the UE to enter the RRC_INACTIVE state, a message indicating the UE to enter the RRC_INACTIVE state may indicate whether the UE retains the first application layer measurement configuration. Further, the network side can further notify the UE of the service type corresponding to the first application layer measurement configuration. Although the message indicating the UE to enter the RRC_INACTIVE state is different from the first message in FIG. 6, a manner in which the message indicating the UE to enter the RRC_INACTIVE state specifically indicates whether the UE retains the first application layer measurement configuration may be one of the plurality of possible specific manners in which the first message in FIG. 6 indicates whether to retain the first application layer measurement configuration and may be the same as or different from a specific manner, finally determined in a protocol, in which the first message indicates whether to retain the first application layer measurement configuration. Details are not described herein.

Before S703, the upper layer of the AS of the UE can send an application layer measurement result to the AS of the UE, and the AS of the UE sends the application layer measurement result to the network side. The base station can send the application layer measurement result to a TCE. For details, refer to the corresponding description in FIG. 5.

S704: The UE initiates an RRC resume process on a base station #2.

The UE sends an RRC resume request message (RRC Resume request message) to the base station #2.

S705: The base station #2 sends an RRC resume message (RRC Resume message) to the UE.

The RRC resume message indicates whether the UE retains the first application layer measurement configuration, that is, whether to continue previous QoE measurement (which may also be described as application layer measurement). For a process in which the RRC resume message indicates whether the UE retains the first application layer measurement configuration, refer to the related description of the first message in FIG. 6. Details are not described herein again.

Optionally, when the UE is in an MR-DC scenario, the base station #1 is an MN, and the base station #2 may also be an MN; or when the base station #1 is an SN, the base station #2 may be an MN. In this case, the SN can generate an RRC reconfiguration message and send the RRC reconfiguration message to the MN. The MN sends, in an RRC resume message, that is, the first message, of the MN, the RRC reconfiguration message generated by the SN to the UE. In this case, that the RRC resume message sent by the base station #2 to the UE indicates whether to retain the first application layer measurement configuration is implemented by using the RRC reconfiguration message generated by the SN and carried in the message to indicate whether to retain the first application layer measurement configuration. Alternatively, the base station #1 is the SN, and the base station #2 is also the MN. The SN first notifies the MN of whether to retain a first application layer measurement configuration previously configured by the SN, and then the MN sends a corresponding first message to the UE.

Optionally, in the MR-DC scenario, the UE can receive two first indication information fields. For example, an RRC resume message may simultaneously carry two first indication information fields, and the two first indication information fields respectively indicate whether to retain an application layer measurement configuration previously configured by the MN for the UE and whether to retain an application layer measurement configuration previously configured by the SN for the UE.

Optionally, the UE can further receive, from the base station #2, information indicating that the base station corresponding to the first application layer measurement configuration is a master node or a secondary node. The information is an explicit indication, or may be an implicit indication. For example, a location of the first indication information field in the first message is used to reflect whether the first indication information field corresponds to the master node or the secondary node.

Further, the base station #2 can further notify the UE of a service type corresponding to the first application layer measurement configuration.

Optionally, the base station #2 can notify the UE of the service type corresponding to the first application layer measurement configuration that is to be retained or released, so that the UE learns the first application layer measurement configuration that is to be retained or released. For a specific manner, refer to the corresponding description in FIG. 6. Details are not described herein again.

S706: The UE receives the RRC resume message, and the AS of the UE continues to retain or release the first application layer measurement configuration.

The AS of the UE determines, based on the RRC resume message, that is, the first message, sent by the base station #2, whether to retain the first application layer measurement configuration.

S707: The AS of the UE sends a notification message to the upper layer of the AS.

Optionally, the notification message may indicate whether the upper layer of the AS retains the first application layer measurement configuration. Although the notification message is different from the first message in FIG. 6, a manner in which the notification message specifically indicates whether the upper layer of the AS retains the first application layer measurement configuration may be one of the plurality of possible specific manners in which the first message in FIG. 6 indicates whether to retain the first application layer measurement configuration and may be the same as or different from a specific manner, finally determined in a protocol, in which the first message indicates whether to retain the first application layer measurement configuration. Details are not described herein. Further, the AS of the UE can further notify the upper layer of the AS of the UE of the service type corresponding to the first application layer measurement configuration that is to be retained and/or an application layer measurement configuration identifier indicating the first application layer measurement configuration.

Optionally, when the AS of the UE determines to continue to retain the first application layer measurement configuration information, the AS of the UE may not need to send the notification message to the upper layer of the AS of the UE. When the AS of the UE determines to release the first application layer measurement configuration information, the AS of the UE sends the notification message to the upper layer of the AS of the UE, to notify that the first application layer measurement configuration information is to be released. Optionally, the AS of the UE sends, to the upper layer of the AS of the UE, an application layer measurement configuration identifier indicating the first application layer measurement configuration information, to indicate which piece of application layer measurement configuration information is to be released. It may be understood that, similar to the manner in which the first message indicates whether to retain the first application layer measurement configuration information, a plurality of pieces of application layer measurement configuration information that is to be released may be notified by using a release list included in the notification message, where the release list may include application layer measurement configuration identifiers respectively corresponding to the plurality of pieces of application layer measurement configuration information.

Optionally, the AS of the UE can notify the upper layer of the AS of a service type corresponding to the first application layer measurement configuration that is to be retained or released, so that the UE learns the first application layer measurement configuration that is to be retained or released. Although the notification herein is different from the notifying party and the notified party in FIG. 6, for a specific notification manner, refer to the corresponding description in FIG. 6 that the first application layer measurement configuration that is to be retained or released is notified by notifying the service type. Details are not described herein.

Optionally, when the AS of the UE retains specific content in the first application layer measurement configuration in S703, and notifies the upper layer of the AS layer of the UE to release the first application layer measurement configuration, and when the notification message indicates the upper layer of the AS to retain the first application layer measurement configuration in S707, the notification message may carry the specific content in the first application layer measurement configuration retained by the AS.

In embodiments of this application, the network side can indicate, based on an actual requirement, whether the UE resumes an application layer measurement configuration received before entering the RRC_INACTIVE state when the UE is resumed from the RRC_INACTIVE state, thereby improving flexible configuration of a network, reducing RRC signaling overheads, and improving accuracy of an application layer measurement result for a specific service.

Figure 8:
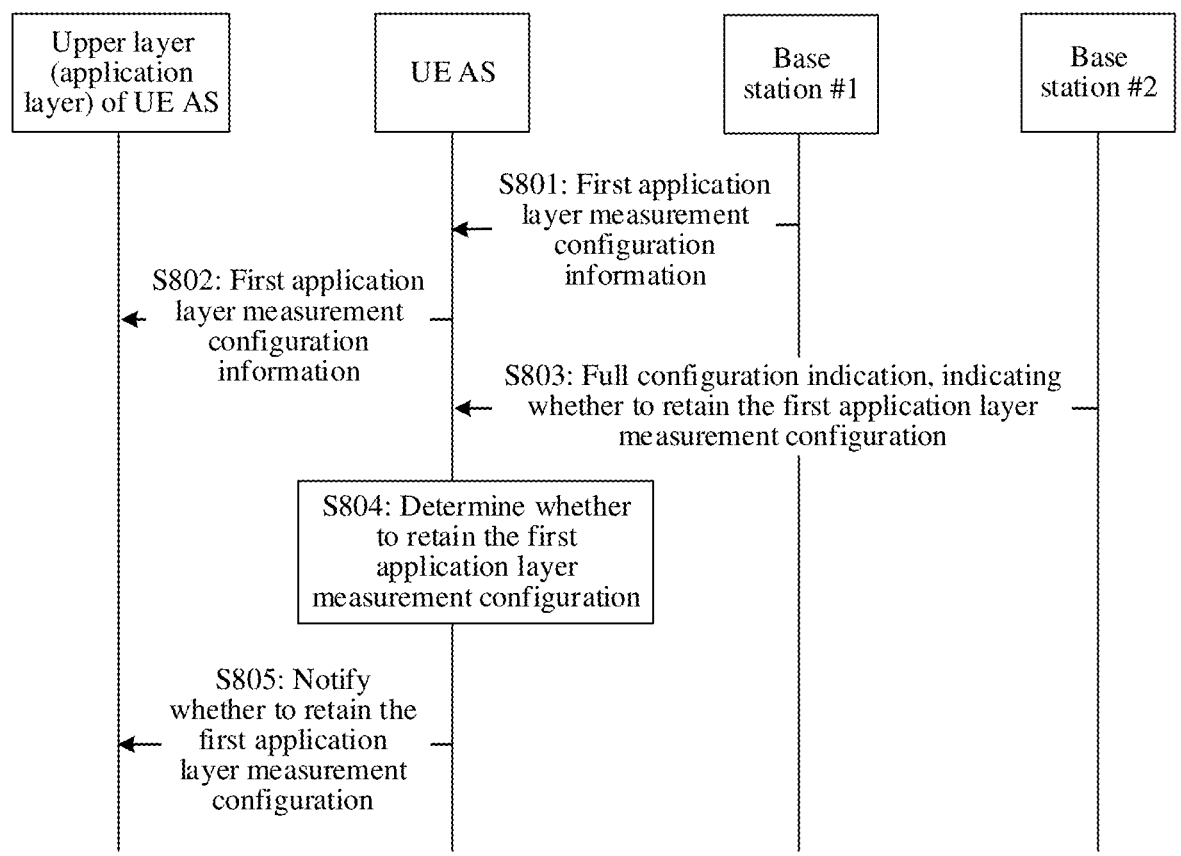
FIG. 8 is a schematic flowchart of a communication method according to an embodiment of this application.

Scenario 2: A network side sends a full configuration (full configuration) indication to UE FIG. 8 is a schematic flowchart of a communication method when a network side sends a full configuration (full configuration) indication to UE according to an embodiment of this application.

The communication method includes the following steps.

S801: A base station #1 sends first application layer measurement configuration information to UE.

Before S801, the base station #1 can obtain QoE measurement configuration information from a CN, an OAM, or an EM, so that the base station #1 obtains the first application layer measurement configuration information. Alternatively, the base station #1 generates the first application layer measurement configuration information based on a requirement of the base station #1.

The base station #1 can further send a service type corresponding to the first application layer measurement configuration information to the UE.

In a non-MR-DC scenario, the base station #1 may be a serving base station.

In an MR-DC scenario, the base station #1 may be a master node or a secondary node.

S802: An AS of the UE sends the first application layer measurement configuration information received from the base station #1 to an upper layer of the AS of the UE.

For S801 and S802, refer to the corresponding descriptions in FIG. 5 and FIG. 6. Details are not described herein again.

S803: A base station #2 sends, to the UE, a message indicating a full configuration.

When the UE is currently in the MR-DC, the base station #2 is a master node.

When the UE is in the non-MR-DC, the base station #2 is a serving base station of the current UE. It may be understood that in the non-MR-DC, the UE has only one serving base station.

The base station #2 and the base station #1 may be a same base station, or may be different base stations.

The message indicating the full configuration indicates whether the UE retains a first application layer measurement configuration. The message indicating the full configuration may be an RRC reconfiguration message, that is, the RRC reconfiguration message includes the information indicating the full configuration. For a specific manner in which the message indicating the full configuration indicates whether the UE retains the first application layer measurement configuration, refer to the description of the first message in FIG. 6. Details are not described herein again.

Further, the base station #2 can further notify the UE of a service type corresponding to a first application layer measurement configuration that is to be retained or released.

Optionally, the base station #2 can notify the UE of the service type corresponding to the first application layer measurement configuration that is to be retained or released, so that the UE learns the first application layer measurement configuration that is to be retained or released by the UE. For a specific manner, refer to the related description of notifying, by using the service type, the first application layer measurement configuration that is to be retained or released in FIG. 6. Details are not described herein again.

Optionally, in the MR-DC scenario, the base station #1 is an MN, and the base station #2 is also an MN; or the base station #1 is an SN, and the base station #2 is an MN. The SN generates an RRC reconfiguration message, where the RRC reconfiguration message indicates whether the UE retains a first application layer measurement configuration. The SN sends the RRC reconfiguration message to the MN, and the MN carries the RRC reconfiguration message generated by the SN in a message indicating a full configuration. In this case, that the message that is sent by the base station #2 to the UE and that indicates the full configuration indicates whether to retain the first application layer measurement configuration is implemented by using the RRC reconfiguration message generated by the SN and carried in the message. Alternatively, the base station #1 is an SN, and the base station #2 is an MN. In this case, the SN first notifies the MN of whether to retain a first application layer measurement configuration previously configured by the SN, and then the MN sends a corresponding first message to the UE.

S804: The UE receives the message indicating the full configuration, and the AS of the UE retains or releases the first application layer measurement configuration.

The AS of the UE determines, based on the message, that is, the first message, that is sent by the base station #2 and that indicates the full configuration, whether to retain the first application layer measurement configuration.

S805: The AS of the UE sends a notification message to the upper layer of the AS.

Optionally, the notification message may indicate whether the upper layer of the AS retains the first application layer measurement configuration. Although the notification message is different from the first message in FIG. 6, a manner in which the notification message specifically indicates whether the upper layer of the AS retains the first application layer measurement configuration may be one of the plurality of possible specific manners in which the first message in FIG. 6 indicates whether to retain the first application layer measurement configuration and may be the same as or different from a specific manner, finally determined in a protocol, in which the first message indicates whether to retain the first application layer measurement configuration. Details are not described herein. Further, the AS of the UE can further notify the upper layer of the AS of the UE of the service type corresponding to the first application layer measurement configuration that is to be retained and/or an application layer measurement configuration identifier indicating the first application layer measurement configuration. Optionally, an application layer measurement result that has been obtained by the upper layer of the AS of the UE may continue to be retained. In other words, a manner or an operation of obtaining the application layer measurement result by the upper layer of the AS of the UE is not affected.

Optionally, when the AS of the UE determines to continue to retain the first application layer measurement configuration information, the AS of the UE does not need to send the notification message to the upper layer of the AS of the UE. When the AS of the UE determines to release the first application layer measurement configuration information, the AS of the UE sends the notification message to the upper layer of the AS of the UE, to notify that the first application layer measurement configuration information is to be released. Optionally, the AS of the UE sends, to the upper layer of the AS of the UE, an application layer measurement configuration identifier indicating the first application layer measurement configuration information, to indicate which piece of application layer measurement configuration information is to be released. It may be understood that, similar to the manner in which the first message indicates whether to retain the first application layer measurement configuration information, a plurality of pieces of application layer measurement configuration information that is to be released may be notified by using a release list included in the notification message, where the release list may include application layer measurement configuration identifiers respectively corresponding to the plurality of pieces of application layer measurement configuration information.

Optionally, the AS of the UE can notify the upper layer of the AS of a service type corresponding to the first application layer measurement configuration that is to be retained or released, so that the UE learns the first application layer measurement configuration that is to be retained or released. Although the notification herein is different from the notifying party and the notified party in FIG. 6, for a specific notification manner, refer to the corresponding description in FIG. 6 that the first application layer measurement configuration that is to be retained or released is notified by notifying the service type. Details are not described herein.

In embodiments of this application, the network side can indicate, in a full configuration process based on an actual requirement, whether the UE retains a previous application layer measurement configuration, thereby improving flexible configuration of a network, reducing RRC signaling overheads, and improving accuracy of an application layer measurement result for a specific service.

Scenario 3: A Network Side Sends an MR-DC Release and Add Indication to UE

Figure 9:
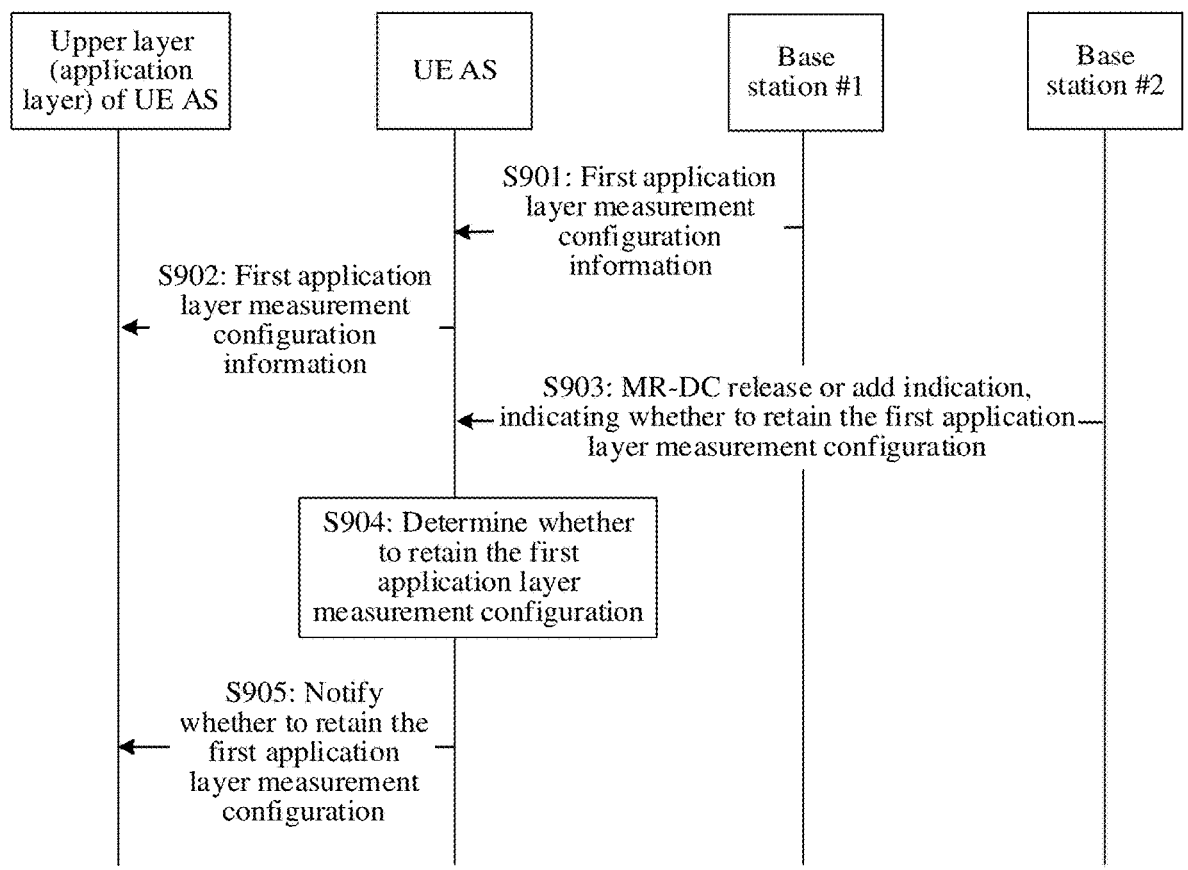
FIG. 9 is a schematic flowchart of a communication method according to an embodiment of this application.

FIG. 9 is a schematic flowchart of a communication method when a network side sends an MR-DC release and add indication to UE according to an embodiment of this application.

The communication method includes the following steps.

S901: A base station #1 sends first application layer measurement configuration information to UE.

Before S901, the base station #1 can obtain QoE measurement configuration information from a CN, an OAM, or an EM, so that the base station #1 obtains the first application layer measurement configuration information. Alternatively, the base station #1 generates the first application layer measurement configuration information based on a requirement of the base station #1.

The base station #1 can further send a service type corresponding to the first application layer measurement configuration information to the UE.

In a non-MR-DC scenario, the base station #1 may be a serving base station.

In an MR-DC scenario, the base station #1 may be a master node or a secondary node.

S902: An AS of the UE sends the first application layer measurement configuration information received from the base station #1 to an upper layer of the AS of the UE.

For S901 and S902, refer to the corresponding descriptions in FIG. 5 and FIG. 6. Details are not described herein again.

S903: A base station #2 sends, to the UE, a message indicating MR-DC release and add.

When the UE is currently in the MR-DC, the base station #2 is a master node.

When the UE is in the non-MR-DC, the base station #2 is a serving base station of the current UE. It may be understood that in the non-MR-DC, the UE has only one serving base station.

The base station #2 and the base station #1 may be a same base station, or may be different base stations.

The message indicating the MR-DC release and add, that is, the first message, indicates whether the UE retains a first application layer measurement configuration. For a detailed description in which the first message indicates whether the UE retains the first application layer measurement configuration, refer to the corresponding description of the first message in FIG. 6. Details are not described herein again.

Further, the base station #2 can further notify the UE of a service type corresponding to a first application layer measurement configuration that is to be retained or released.

Optionally, the base station #2 can notify the UE of the service type corresponding to the first application layer measurement configuration that is to be retained or released, so that the UE learns the first application layer measurement configuration that is to be retained or released by the UE. For a specific notification manner, refer to the related description of notifying, by using the service type, the first application layer measurement configuration that is to be retained or released in FIG. 6. Details are not described herein again.

Optionally, in the MR-DC scenario, the base station #1 is an MN, and the base station #2 is also an MN; or the base station #1 is an SN, and the base station #2 is an MN. In this case, the SN first notifies the MN of whether to retain a first application layer measurement configuration previously configured by the SN, and then the MN sends a corresponding first message to the UE based on the notification. Alternatively, the base station #1 is an SN, and the base station #2 is an MN. The SN generates an RRC reconfiguration message, where the RRC reconfiguration message indicates whether the UE retains a first application layer measurement configuration. The SN sends the RRC reconfiguration message to the MN, and the MN carries the RRC reconfiguration message generated by the SN in a message indicating MR-DC release and add. In this case, that the message that is sent by the base station #2 to the UE and that indicates the MR-DC release and add indicates whether to retain the first application layer measurement configuration is implemented by using the RRC reconfiguration message generated by the SN and carried in the message to indicate whether to retain the first application layer measurement configuration.

S904: The UE receives the message indicating the MR-DC release and add, and the AS of the UE retains or releases the first application layer measurement configuration.

The AS of the UE determines, based on the message indicating the MR-DC release and add, whether to retain the first application layer measurement configuration.

S905: The AS of the UE sends a notification message to the upper layer of the AS.

Optionally, the notification message may indicate whether the upper layer of the AS retains the first application layer measurement configuration. Although the notification message is different from the first message in FIG. 6, a manner in which the notification message specifically indicates whether the upper layer of the AS retains the first application layer measurement configuration may be one of the plurality of possible specific manners in which the first message in FIG. 6 indicates whether to retain the first application layer measurement configuration and may be the same as or different from a specific manner, finally determined in a protocol, in which the first message indicates whether to retain the first application layer measurement configuration. Details are not described herein. Further, the AS of the UE can further notify the upper layer of the AS of the UE of the service type corresponding to the first application layer measurement configuration that is to be retained and/or an application layer measurement configuration identifier indicating the first application layer measurement configuration. Optionally, an application layer measurement result that has been obtained by the upper layer of the AS of the UE may continue to be retained. In other words, a manner or an operation of obtaining the application layer measurement result by the upper layer of the AS of the UE is not affected.

Optionally, when the AS of the UE determines to continue to retain the first application layer measurement configuration information, the AS of the UE may not need to send the notification message to the upper layer of the AS of the UE. When the AS of the UE determines to release the first application layer measurement configuration information, the AS of the UE sends the notification message to the upper layer of the AS of the UE, to notify that the first application layer measurement configuration information is to be released. Optionally, the AS of the UE sends, to the upper layer of the AS of the UE, an application layer measurement configuration identifier indicating the first application layer measurement configuration information, to indicate which piece of application layer measurement configuration information is to be released. It may be understood that, similar to the manner in which the first message indicates whether to retain the first application layer measurement configuration information, a plurality of pieces of application layer measurement configuration information that is to be released may be notified by using a release list included in the notification message, where the release list may include application layer measurement configuration identifiers respectively corresponding to the plurality of pieces of application layer measurement configuration information.

Optionally, the AS of the UE can notify the upper layer of the AS of a service type corresponding to the first application layer measurement configuration that is to be retained or released, so that the UE learns the first application layer measurement configuration that is to be retained or released. Although the notification herein is different from the notifying party and the notified party in FIG. 6, for a specific notification manner, refer to the corresponding description in FIG. 6 that the first application layer measurement configuration that is to be retained or released is notified by notifying the service type. Details are not described herein. In embodiments of this application, the network side can indicate, in an MR-DC release and add process based on an actual requirement, whether the UE retains a previous application layer measurement configuration, thereby improving flexible configuration of a network, reducing RRC signaling overheads, and improving accuracy of an application layer measurement result of a specific service.

Scenario 4: A Network Side Sends an SCG Configuration Release Indication to UE

In embodiments of this application, when a base station sends an SCG configuration release indication to UE, that is, when the UE is changed from an MR-DC scenario to a non-MR-DC scenario, or a data bearer type of the UE in an MR-DC changes, for example, changed from an SCG bearer whose a PDCP is terminated on an SN (SN terminated SCG bearer) to an MCG bearer whose a PDCP is terminated on the SN or an MN (SN terminated MCG bearer), the UE retains a first application layer measurement configuration previously configured by the SN.

Figure 10:
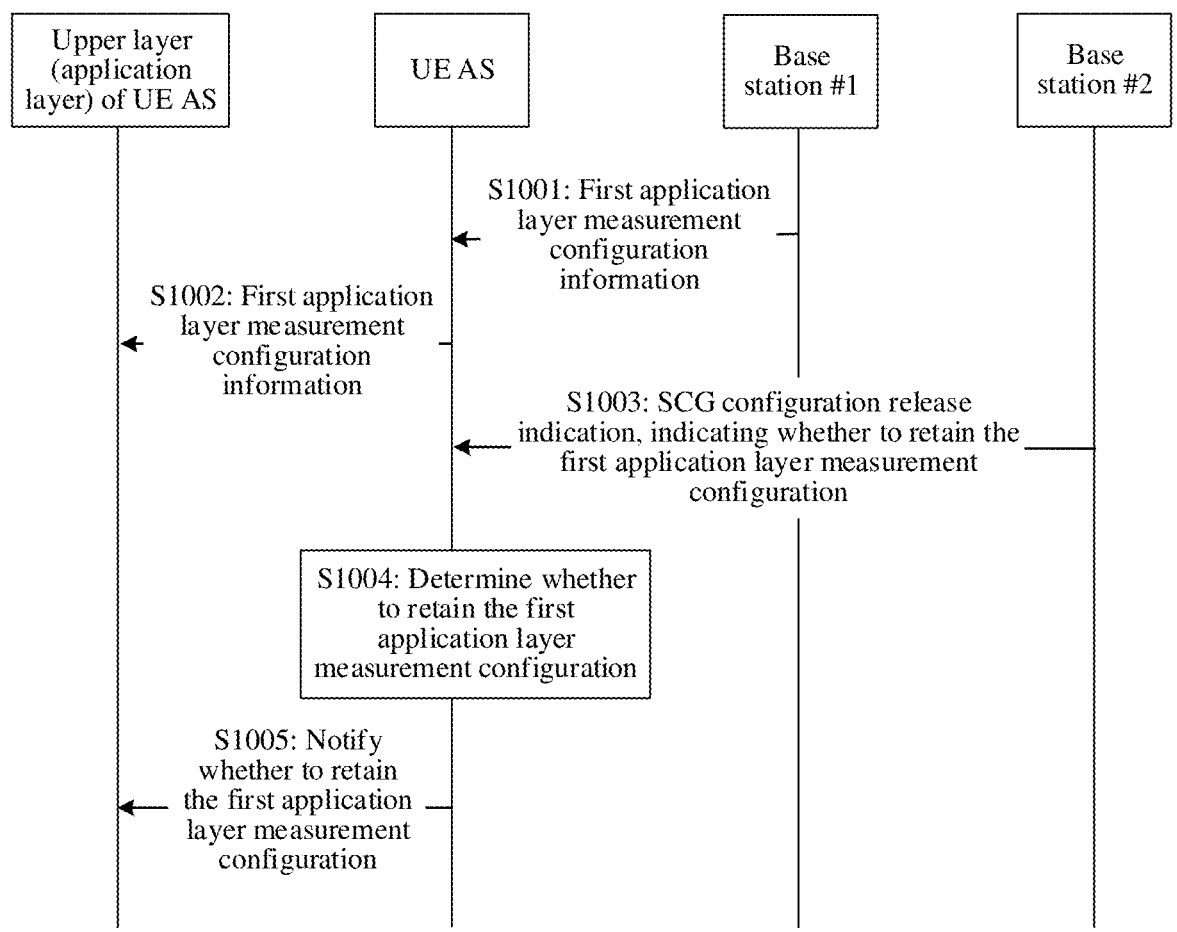
FIG. 10 is a schematic flowchart of a communication method according to an embodiment of this application.

FIG. 10 is a schematic flowchart of a communication method when a network side sends an SCG configuration release indication to UE according to an embodiment of this application.

The communication method includes the following steps.

S1001: A base station #1 sends first application layer measurement configuration information to UE.

Before S1001, the base station #1 can obtain QoE measurement configuration information from a CN, an OAM, or an EM, so the base station #1 obtains the first application layer measurement configuration information. Alternatively, the base station #1 generates the first application layer measurement configuration information based on a requirement of the base station #1.

The base station #1 can further send a service type corresponding to the first application layer measurement configuration information to the UE.

The base station #1 is a secondary node SN.

S1002: An AS of the UE sends the first application layer measurement configuration information received from the base station #1 to an upper layer of the AS of the UE.

For S1001 and S1002, refer to the corresponding descriptions in FIG. 5 and FIG. 6.

S1003: A base station #2 sends, to the UE, a message indicating release of an SCG configuration.

The base station #2 is a master node.

The base station #2 sends, to the UE, the message indicating release of the SCG configuration, that is, a first message. The first message indicates whether to retain a first application layer measurement configuration previously configured by the SN, or whether to apply a first application layer measurement configuration previously configured by the SN to a second application layer measurement configuration of the MN.

Optionally, an implementation of applying the first application layer measurement configuration configured by the SN to the second application layer measurement configuration of the MN may include one or more of the following three manners:

Manner 1: After the UE receives the first application layer measurement configuration information in S1001, the UE stores the first application layer measurement configuration information in a variable in an RRC corresponding to the SN. After the UE receives an SCG configuration release indication, the UE stores, in a variable in an RRC corresponding to the MN, a value of the variable in which the UE previously stores the first application layer measurement configuration information in the RRC corresponding to the SN.

Manner 2: The UE marks or points, in AS context (context), the first application layer measurement configuration configured by the SN as or to an application layer measurement configuration of the MN. For example, configurations of the MN and the SN that correspond to the UE share one AS context. The context stores configuration information of the MCG and the SCG (including information about the first application layer measurement configuration configured by the SN), and the context carries indication information, indicating that the information about the first application layer measurement configuration is from the SN. After the UE receives the first message, the UE modifies the indication information, to indicate that the information about the first application layer measurement configuration is from the MN.

Manner 3: The UE adds the first application layer measurement configuration configured by the SN to AS context of the MN. For a specific manner in which the first message indicates whether to retain a first application layer measurement configuration previously configured by the SN, refer to the related description of the first message in FIG. 6. Details are not described herein again.

It may be understood that, because the UE receives the SCG configuration release indication, the first application layer measurement configuration configured by the SN does not have an anchor base station. In this case, the UE receives an indication indicating that the first application layer measurement configuration is to be retained, and the UE can apply the first application layer measurement configuration that is to be retained to application layer measurement of the MN according to a protocol agreement. Alternatively, a protocol may agree that first indication information received by the UE directly indicates that the first application layer measurement configuration configured by the SN is applied to application layer measurement of the MN. In other words, "retaining the first application layer measurement configuration configured by the SN" may be equivalent to "applying the first application layer measurement configuration configured by the SN to the application layer measurement of the MN". Correspondingly, the UE receives an indication indicating to not retain the first application layer measurement configuration, and the UE can release the first application layer measurement configuration according to a protocol agreement, which also means that the first application layer measurement configuration is not applied to the application layer measurement of the MN.

Further, the base station #2 can further notify the UE of a service type corresponding to the first application layer measurement configuration.

Further, the base station #2 can further configure, for the UE, a radio bearer, for example, a signaling radio bearer, used to transmit a measurement result corresponding to the first application layer measurement configuration.

Optionally, the base station #2 can further notify the UE of a service type corresponding to a first application layer measurement configuration that is to be retained or released and configured by the SN, to notify the corresponding first application layer measurement configuration that is to be retained or released and configured by the SN. For a specific manner, refer to the corresponding description in FIG. 6. Details are not described herein again.

Optionally, before S1003, the base station #1 sends, to the base station #2, the first application layer measurement configuration information sent to the UE in S1001. Further, the base station #1 sends the service type corresponding to the first application layer measurement configuration information to the base station #2.

Optionally, the base station #1 sends, to the base station #2, the first application layer measurement configuration information and an application layer measurement configuration identifier allocated by the base station #1 to the first application layer measurement configuration information.

S1004: The UE receives the message indicating release of the SCG configuration, and the AS of the UE retains or releases the first application layer measurement configuration previously configured by the SN.

The AS of the UE determines, based on the first message sent by the base station #2, whether to retain the first application layer measurement configuration, or whether to apply the first application layer measurement configuration configured by the SN to the application layer measurement of the MN. If the first application layer measurement configuration is not to be retained or the first application layer measurement configuration configured by the SN is not to be applied to the application layer measurement of the MN, the AS of the UE indicates the upper layer of the AS layer of the UE to release the first application layer measurement configuration previously configured by the SN. S1005: The AS of the UE sends a notification message to the upper layer of the AS.

Optionally, the notification message may indicate whether the upper layer of the AS retains the first application layer measurement configuration. Although the notification message is different from the first message in FIG. 6, a manner in which the notification message specifically indicates whether the upper layer of the AS retains the first application layer measurement configuration may be one of the plurality of possible specific manners in which the first message in FIG. 6 indicates whether to retain the first application layer measurement configuration and may be the same as or different from a specific manner, finally determined in a protocol, in which the first message indicates whether to retain the first application layer measurement configuration. Details are not described herein. Further, the AS of the UE can further notify the upper layer of the AS of the UE of the service type corresponding to the first application layer measurement configuration that is to be retained and/or an application layer measurement configuration identifier indicating the first application layer measurement configuration.

Optionally, when the AS of the UE determines to continue to retain the first application layer measurement configuration information, the AS of the UE does not need to send the notification message to the upper layer of the AS of the UE. When the AS of the UE determines to release the first application layer measurement configuration information, the AS of the UE sends the notification message to the upper layer of the AS of the UE, to notify that the first application layer measurement configuration information is to be released. Optionally, the AS of the UE sends, to the upper layer of the AS of the UE, an application layer measurement configuration identifier indicating the first application layer measurement configuration information, to indicate which piece of application layer measurement configuration information is to be released. It may be understood that, similar to the manner in which the first message indicates whether to retain the first application layer measurement configuration information, a plurality of pieces of application layer measurement configuration information that is to be released may be notified by using a release list included in the notification message, where the release list may include application layer measurement configuration identifiers respectively corresponding to the plurality of pieces of application layer measurement configuration information.

Optionally, if the upper layer of the AS of the UE continues to retain the first application layer measurement configuration, an application layer measurement result that has been obtained by the upper layer of the AS of the UE may continue to be retained. In other words, a manner or an operation of obtaining the application layer measurement result by the upper layer of the AS of the UE may not be affected.

Optionally, if the AS of the UE retains the first application layer measurement configuration, the AS of the UE sends indication information to the upper layer of the AS of the UE, to indicate that a subsequent measurement result is sent to an RRC layer corresponding to the MN, for example, an RRC layer of the base station #2. In embodiments of this application, a network side can indicate, in SCG configuration release based on an actual requirement, whether the UE retains a first application layer measurement configuration previously configured by the SN, or whether to apply a first application layer measurement configuration configured by the SN to application layer measurement configuration of the MN, thereby improving flexible configuration of a network, reducing RRC signaling overheads, and improving accuracy of an application layer measurement result for a specific service.

It may be understood that, for the detailed descriptions of the specific procedures in FIG. 6 to FIG. 10, reference may be made to each other or a combination thereof, and details are not described herein again.

The communication methods in embodiments of this application are described above in detail with reference to FIG. 6 to FIG. 10. The following describes in detail a communication apparatus in embodiments of this application with reference to FIG. 11 to FIG. 13.

Figure 11:
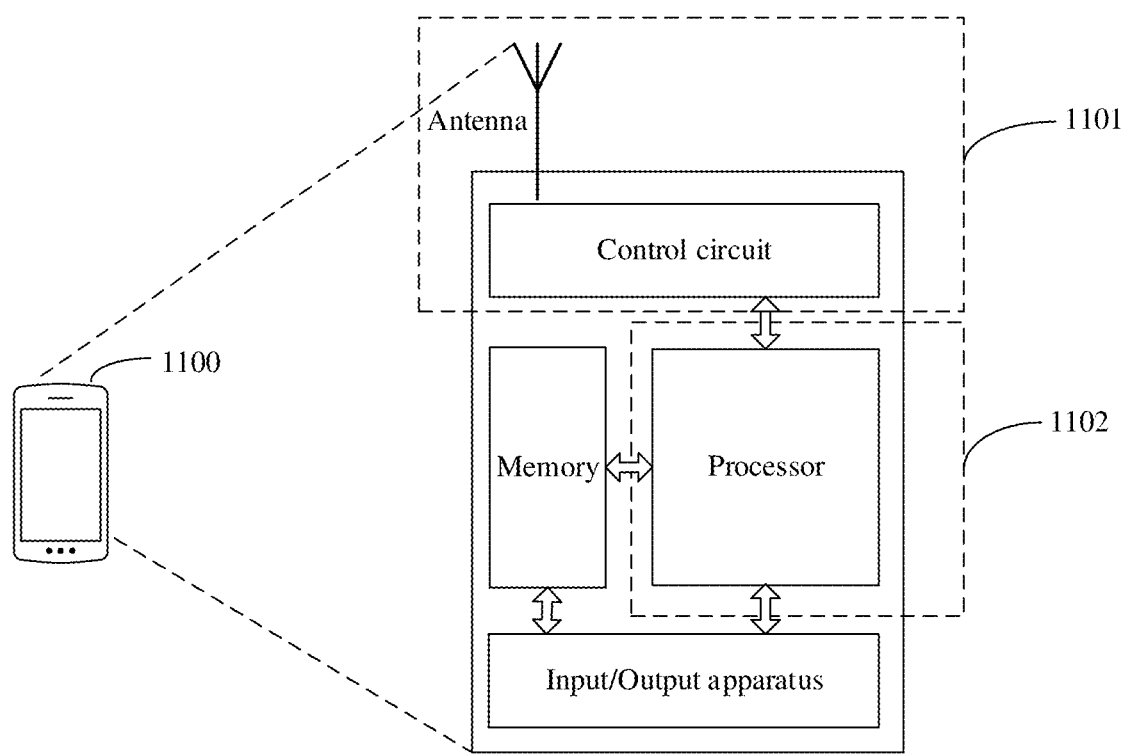
FIG. 11 is a schematic diagram of a structure of a terminal according to an embodiment of this application.

FIG. 11 is a schematic diagram of a structure of a terminal according to an embodiment of this application. The terminal can be used in the system shown in FIG. 1, to execute a function of the terminal in the foregoing method embodiments. For ease of description, FIG. 11 shows only main components of the terminal. As shown in FIG. 11, the terminal 1100 includes a processor, a memory, a control circuit, an antenna, and an input/output apparatus. The processor is mainly configured to process a communication protocol and communication data, control the entire terminal, execute a software program, and process data of the software program, for example, is configured to support the terminal in performing the actions described in the foregoing method embodiments. The memory is mainly configured to store the software program and data. The control circuit is mainly configured to convert a baseband signal and a radio frequency signal and process the radio frequency signal. The control circuit and the antenna together may also be referred to as a transceiver, and are mainly configured to send and receive a radio frequency signal in a form of an electromagnetic wave. The input/output apparatus, for example, a touchscreen, a display, or a keyboard, is mainly configured to receive data input by a user and output data to the user.

After the terminal is turned on, the processor may read the software program in the memory, interpret and execute instructions of the software program, and process the data of the software program. When data needs to be sent wirelessly, the processor performs baseband processing on the to-be-sent data, and then outputs a baseband signal to a radio frequency circuit. The radio frequency circuit performs radio frequency processing on the baseband signal, and then sends, by using the antenna, a radio frequency signal in a form of an electromagnetic wave. When data is sent to the terminal, the radio frequency circuit receives a radio frequency signal through the antenna, converts the radio frequency signal into a baseband signal, and outputs the baseband signal to the processor. The processor converts the baseband signal into data, and processes the data.

A person skilled in the art may understand that for ease of description, FIG. 11 shows only one memory and one processor. In an actual terminal, there may be a plurality of processors and a plurality of memories. The memory may also be referred to as a storage medium, a storage device, or the like. The memory may be a storage element located on a same chip as the processor, namely, an on-chip storage element, or may be an independent storage element. This is not limited in embodiments of this application.

In an optional implementation, the terminal may include a baseband processor and a central processing unit. The baseband processor is mainly configured to process a communication protocol and communication data. The central processing unit is mainly configured to control the entire terminal, execute a software program, and process data of the software program. Functions of the baseband processor and the central processing unit may be integrated into the processor in FIG. 11. A person skilled in the art may understand that the baseband processor and the central processing unit each may be an independent processor, and are interconnected by using a technology such as a bus. A person skilled in the art may understand that the terminal may include a plurality of baseband processors to adapt to different network standards, and the terminal may include a plurality of central processing units to enhance a processing capability of the terminal. All the components of the terminal may be connected through various buses. The baseband processor may also be expressed as a baseband processing circuit or a baseband processing chip. The central processing unit may alternatively be expressed as a central processing circuit or a central processing chip. The function of processing the communication protocol and the communication data may be built in the processor, or may be stored in the memory in a form of a software program, and the processor executes the software program to implement a baseband processing function.

In embodiments of this application, the antenna and the control circuit that have a transceiver function may be considered as a transceiver unit 1101 of the terminal 1100, for example, to support the terminal in performing a receiving function and a sending function. The processor 1102 having a processing function is considered as a processing unit 1102 of the terminal 1100. As shown in FIG. 11, the terminal 1100 includes the transceiver unit 1101 and the processing unit 1102. The transceiver unit may also be referred to as a transceiver machine, a transceiver, a transceiver apparatus, or the like. Optionally, a component configured to implement a receiving function in the transceiver unit 1101 may be considered as a receiving unit. A component configured to implement a sending function in the transceiver unit 1101 may be considered as a sending unit. In other words, the transceiver unit 1101 includes the receiving unit and the sending unit. The receiving unit may also be referred to as a receiver, an input port, a receiving circuit, or the like. The sending unit may be referred to as a transmitter, a transmitter, a transmitting circuit, or the like.

The processor 1102 may be configured to execute instructions stored in the memory, to control the transceiver unit 1101 to receive a signal and/or send a signal, to complete a function of the terminal in the foregoing method embodiments. The processor 1102 further includes an interface, configured to implement a signal input/output function. In an implementation, a function of the transceiver unit 1101 may be implemented by using a transceiver circuit or a transceiver-dedicated chip.

Figure 12:
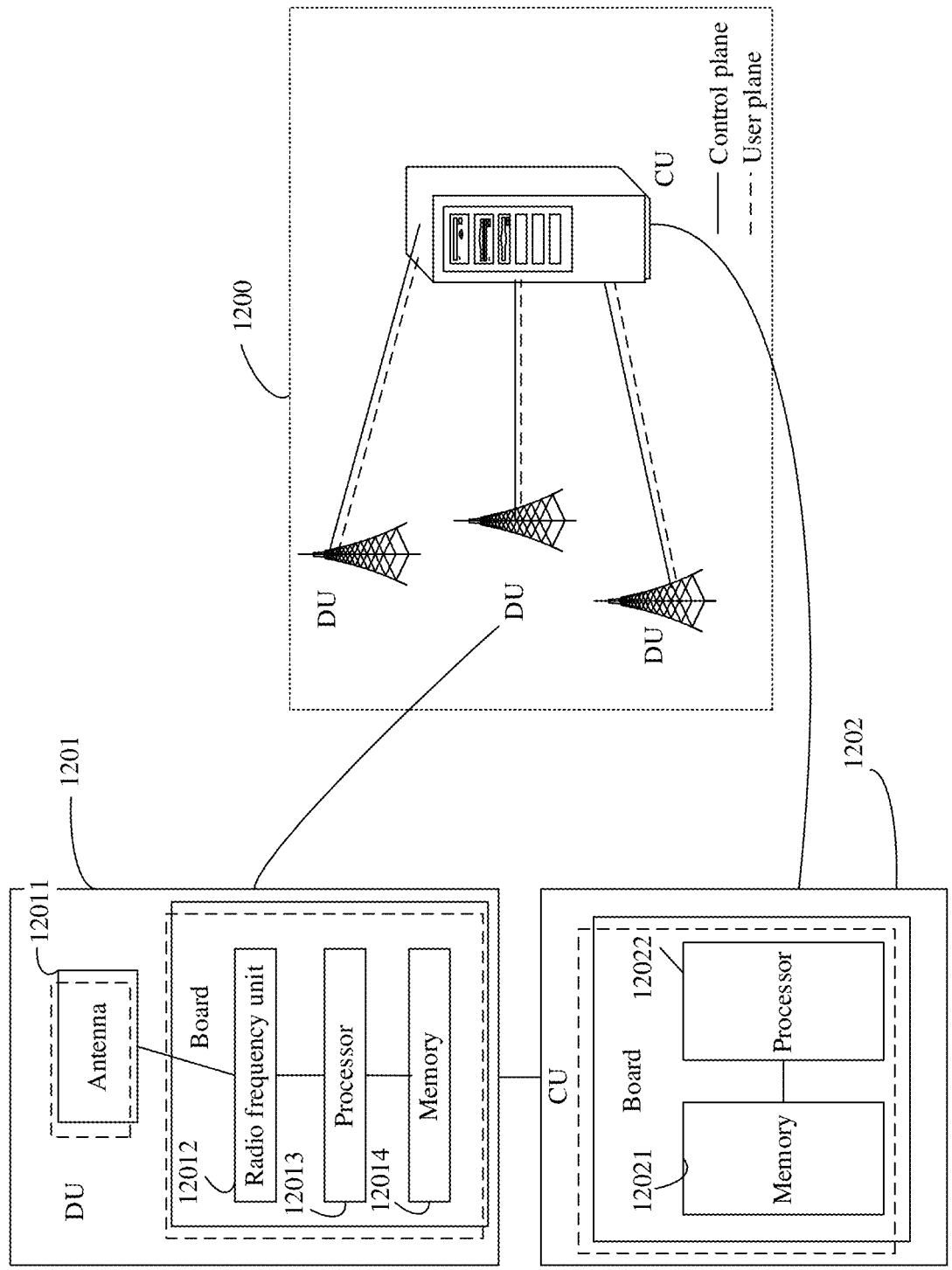
FIG. 12 is a schematic diagram of a structure of an access network device according to an embodiment of this application.

FIG. 12 is a schematic diagram of a structure of an access network device according to an embodiment of this application, for example, may be a schematic diagram of a structure of a base station. As shown in FIG. 12, the base station may be used in the system shown in FIG. 1, to execute functions of the access network device in the foregoing method embodiments. The base station 1200 may include one or more DUs 1201 and one or more CUs 1202. The CU 1202 may communicate with an NG core (next generation core network, NC) or an EPC. The DU 1201 may include at least one antenna 12011, at least one radio frequency unit 12012, at least one processor 12013, and at least one memory 12014. The DU 1201 part is mainly configured to send and receive a radio frequency signal, convert a radio frequency signal and a baseband signal, and process some basebands. The CU 1202 may include at least one processor 12022 and at least one memory 12021. The CU 1202 and the DU 1201 may communicate with each other through an interface. A control plane (Control plane) interface may be Fs-C, for example, F1-C, and a user plane (User Plane) interface may be Fs-U, for example, F1-U.

The CU 1202 part is mainly configured to perform baseband processing, control the base station, and the like. The DU 1201 and the CU 1202 may be physically disposed together, or may be physically separately disposed, that is, a distributed base station. The CU 1202 is a control center of the base station, may also be referred to as a processing unit, and is mainly configured to complete a baseband processing function. For example, the CU 1202 may be configured to control the base station to perform an operation procedure related to the access network device in the foregoing method embodiments.

Specifically, baseband processing of the CU and the DU may be divided based on a protocol layer of a wireless network. For example, functions of a PDCP layer and protocol layers above the PDCP layer are set in the CU, and functions of protocol layers such as an RLC layer, a MAC layer, and a PHY layer below the PDCP layer are set in the DU.

In addition, optionally, the base station 1200 may include one or more radio frequency units (RUs), one or more DUs, and one or more CUs. The DU may include at least one processor 12013 and at least one memory 12014, the RU may include at least one antenna 12011 and at least one radio frequency unit 12012, and the CU may include at least one processor 12022 and at least one memory 12021.

In an example, the CU 1202 may include one or more boards. A plurality of boards may jointly support a radio access network (for example, a 5G network) of a single access standard, or may separately support radio access networks of different access standards (such as an LTE network, a 5G network, or another network). The memory 12021 and the processor 12022 may serve one or more boards. In other words, a memory and a processor may be disposed on each board. Alternatively, a plurality of boards may share a same memory and a same processor. In addition, a necessary circuit may further be disposed on each board. The DU 1201 may include one or more boards. A plurality of boards may jointly support a radio access network (for example, a 5G network) of a single access standard, or may separately support radio access networks (for example, an LTE network, a 5G network, and another network) of different access standards. The memory 12014 and the processor 12013 may serve one or more boards. In other words, a memory and a processor may be disposed on each board. Alternatively, a plurality of boards may share a same memory and a same processor. In addition, a necessary circuit may further be disposed on each board.

Figure 13:
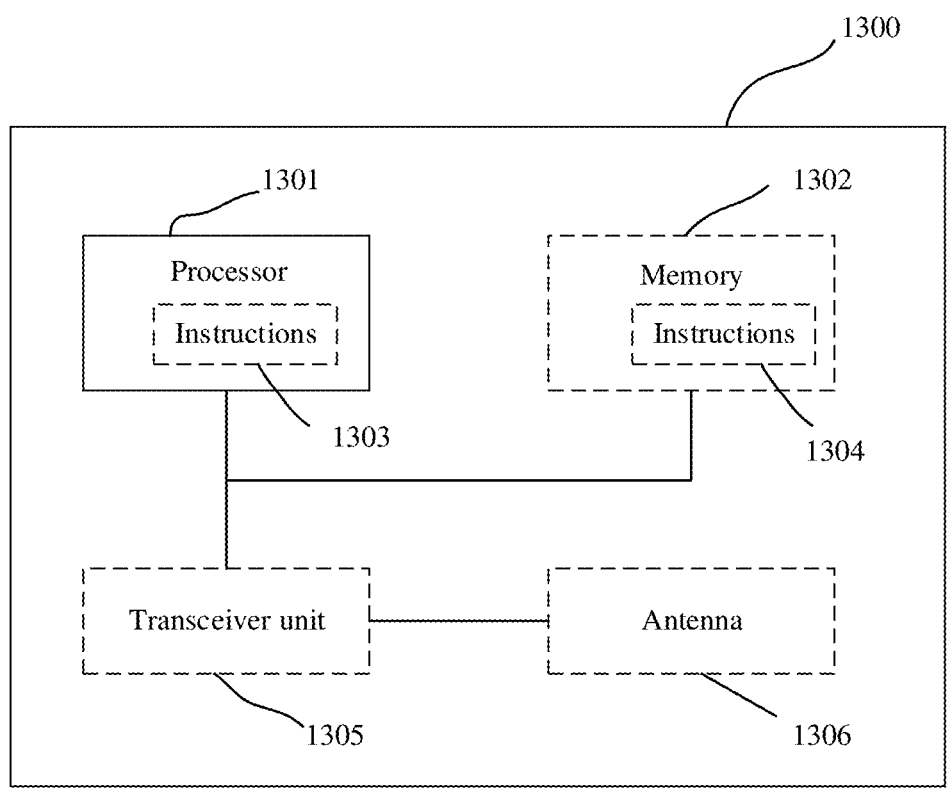
FIG. 13 is a schematic diagram of a structure of a communication apparatus according to an embodiment of this application.

FIG. 13 is a schematic diagram of a structure of a communication apparatus 1300. The communication apparatus 1300 may be configured to implement the methods described in the foregoing method embodiments. For details, refer to the descriptions in the foregoing method embodiments. The communication apparatus 1300 may be a chip, an access network device (for example, a base station), a terminal, a core network device (for example, an AMF, or an AMF and an SMF), another network device, or the like.

The communication apparatus 1300 includes one or more processors 1301. The processor 1301 may be a general-purpose processor, a special-purpose processor, or the like. For example, the processor may be a baseband processor or a central processing unit. The baseband processor may be configured to process a communication protocol and communication data. The central processing unit may be configured to control the apparatus (for example, the base station, the terminal, the AMF, or the chip), execute a software program, and process data of the software program. The apparatus may include a transceiver unit configured to input (receive) and output (send) a signal. For example, the apparatus may be a chip, and the transceiver unit may be an input and/or output circuit or a communication interface of the chip. The chip may be used for a terminal, an access network device (for example, a base station), or a core network device. For another example, the apparatus may be a terminal or an access network device (for example, a base station), and the transceiver unit may be a transceiver, a radio frequency chip, or the like.

The communication apparatus 1300 includes one or more processors 1301, and the one or more processors 1301 may implement the method of the base station or the terminal in embodiments shown in FIG. 6 to FIG. 10.

In a possible design, the communication apparatus 1300 includes a means (means) configured to receive a first message from a second base station, and a means (means) configured to, when the first message indicates to retain the first application layer measurement configuration information, continue to perform QoE measurement, and/or when the first message indicates to not retain the first application layer measurement configuration information, release the first application layer measurement configuration information. Functions of the means may be implemented through one or more processors. For example, the one or more processors may be configured to send the information by using a transceiver, an input/output circuit, or an interface of a chip. Reference may be made to the related descriptions in the foregoing method embodiments.

In a possible design, the communication apparatus 1300 includes a means (means) configured to send a first message to a terminal, and a means (means) configured to generate the first message. Reference may be made to the related descriptions in the foregoing method embodiments. For example, the first message may be received by using a transceiver, an input/output circuit, or an interface of a chip, or may be received by using one or more processors.

Optionally, in addition to implementing the method in embodiments shown in FIG. 6 to FIG. 10, the processor 1301 can further implement another function.

Optionally, in a design, the processor 1301 may also include instructions 1303. The instructions may be run on the processor, so that the communication apparatus 1300 performs the method described in the foregoing method embodiments.

In still another possible design, the communication apparatus 1300 may alternatively include a circuit. The circuit may implement the function of the access network device or the terminal in the foregoing method embodiments.

In another possible design, the communication apparatus 1300 may include one or more memories 1302. The memory stores instructions 1304. The instructions may be run on the processor, so that the communication apparatus 1300 performs the method described in the foregoing method embodiments. Optionally, the memory may further store data. Optionally, the processor may also store instructions and/or data. For example, the one or more memories 1302 may store the first application layer measurement configuration described in the foregoing embodiments, or other information such as the service type in the foregoing embodiments. The processor and the memory may be separately disposed, or may be integrated together.

In still another possible design, the communication apparatus 1300 may further include a transceiver unit 1305 and an antenna 1306, or include a communication interface. The transceiver unit 1305 may be referred to as a transceiver, a transceiver circuit, or the like, and is configured to implement a transceiver function of the apparatus through the antenna 1306. The communication interface (not shown in the figure) may be used for communication between a core network device and an access network device, or communication between an access network device and an access network device. Optionally, the communication interface may be a wired communication interface, for example, an optical fiber communication interface.

The processor 1301 may be referred to as a processing unit, and controls the apparatus (for example, the terminal, the base station, or the AMF).

This application further provides a communication system, including one or a combination of the foregoing one or more access network devices, one or more terminals, and a core network device.

It should be understood that, the processor in embodiments of this application may be a central processing unit (central processing unit, CPU). The processor may be further another general-purpose processor, a digital signal processor (digital signal processor, DSP), an application specific integrated circuit (application specific integrated circuit, ASIC), a field programmable gate array (field programmable gate array, FPGA), or another programmable logic device, discrete gate or transistor logic device, discrete hardware component, or the like. The general-purpose processor may be a microprocessor, or the processor may be any conventional processor or the like.

It may be further understood that the memory in embodiments of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through an example rather than a limitative description, random access memories (random access memory, RAM) in many forms may be used, for example, a static random access memory (static RAM, SRAM), a dynamic random access memory (dynamic random access memory, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or some of the foregoing embodiments may be implemented using software, hardware (for example, circuit), firmware, or any combination thereof. When software is used to implement embodiments, the foregoing embodiments may be implemented completely or partially in a form of a computer program product. The computer program product includes one or more computer instructions or computer programs. When the program instructions or the computer programs are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired manner, for example, an optical fiber, or a wireless manner, for example, infrared, radio, or microwave. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, communication apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist independently physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, performed by a terminal or a chip for the terminal, the method comprising:
   receiving first application layer measurement configuration information from a first base station;
   performing quality of experience (QoE) measurement based on the first application layer measurement configuration information;
   receiving a first message or a third message from a second base station, wherein
      the first message indicates to not retain the first application layer measurement configuration information, and
      the third message indicates to retain the first application layer measurement configuration information; and
   releasing the first application layer measurement configuration information in response to the first message, or continuing to perform QoE measurement based on the first application layer measurement configuration information in response to the third message.

2. The method according to claim 1, wherein the first message or the third message comprises at least one of:
   a message indicating radio resource control (RRC) resume,
   a message indicating a full configuration,
   a message indicating at least one of dual connectivity (DC) release or add, or
   a message indicating release of a secondary cell group (SCG) configuration.

3. The method according to claim 1, wherein
   the first message excludes an application layer measurement configuration identifier of the first application layer measurement configuration information to indicate to release the first application layer measurement configuration information; or
   the first message excludes a first indication information field to indicate to release the first application layer measurement configuration information.

4. The method according to claim 1, wherein
   the first message or the third message further comprises information indicating a service type of the first application layer measurement configuration information.

5. The method according to claim 1, wherein the releasing the first application layer measurement configuration information comprises:
   determining, by an access stratum (AS) of the terminal based on the first message, that the first application layer measurement configuration information is to be released, and
   sending a second message to an upper layer of the AS, wherein the second message indicates that the first application layer measurement configuration information is to be released.

6. The method according to claim 1, wherein the continuing to perform QoE measurement comprises:
   determining, by an access stratum (AS) of the terminal based on the third message, that the first application layer measurement configuration information is to be retained, and
   sending a second message to an upper layer of the AS, wherein the second message indicates that the first application layer measurement configuration information is to be retained.

7. The method according to claim 6, wherein
   before the upper layer of the AS of the terminal receives the second message, the upper layer of the AS does not store the first application layer measurement configuration information, and the method further comprises:
   sending, by the AS, the first application layer measurement configuration information to the upper layer of the AS.

8. The method according to claim 1, wherein
   the first message or the third message from the second base station indicates a radio resource control (RRC) resume.

9. The method according to claim 1, wherein
   the first base station is a master node (MN) in dual connectivity, and the second base station is a secondary node (SN) in the dual connectivity; or
   the first base station is a secondary node (SN) in dual connectivity, and the second base station is a master node (MN) in the dual connectivity.

10. A communication apparatus, comprising:
    one or more processors and one or more memories, wherein
    the one or more processors are configured to execute programs stored in the one or more memories to cause the apparatus to perform operations comprising:
    receiving first application layer measurement configuration information from a first base station;
    performing quality of experience (QoE) measurement based on the first application layer measurement configuration information;
    receiving a first message or a third message from a second base station, wherein
       the first message indicates to not retain the first application layer measurement configuration information, and
       the third message indicates to retain the first application layer measurement configuration information; and
    releasing the first application layer measurement configuration information in response to the first message, or continuing to perform QoE measurement based on the first application layer measurement configuration information in response to the third message.

11. The apparatus according to claim 10, wherein the first message or the third message comprises at least one of:
    a message indicating radio resource control (RRC) resume,
    a message indicating a full configuration,
    a message indicating at least one of dual connectivity (DC) release or add, or
    a message indicating release of a secondary cell group (SCG) configuration.

12. The apparatus according to claim 10, wherein
    the first message excludes an application layer measurement configuration identifier of the first application layer measurement configuration information to indicate to release the first application layer measurement configuration information; or
    the first message excludes a first indication information field to indicate to release the first application layer measurement configuration information.

13. The apparatus according to claim 10, wherein
the first message or the third message further comprises information indicating a service type of the first application layer measurement configuration information.

14. The apparatus according to claim 10, wherein the releasing the first application layer measurement configuration information comprises:
determining, by an access stratum (AS) of the apparatus based on the first message, that the first application layer measurement configuration information is to be released, and
sending a second message to an upper layer of the AS, wherein the second message indicates that the first application layer measurement configuration information is to be released.

15. The apparatus according to claim 10, wherein the continuing to perform QoE measurement comprises:
determining, by an access stratum (AS) of the apparatus based on the third message, that the first application layer measurement configuration information is to be retained, and
sending a second message to an upper layer of the AS, wherein the second message indicates that the first application layer measurement configuration information is to be retained.

16. The apparatus according to claim 15, wherein
before the upper layer of the AS receives the second message, the upper layer of the AS does not store the first application layer measurement configuration information, and
the operations further comprise:
sending, by the AS, the first application layer measurement configuration information to the upper layer of the AS.

17. The apparatus according to claim 10, wherein
the first message or the third message from the second base station indicates a radio resource control (RRC) resume.

18. The apparatus according to claim 10, wherein
the first base station is a master node (MN) in dual connectivity, and the second base station is a secondary node (SN) in the dual connectivity; or
the first base station is a secondary node (SN) in dual connectivity, and the second base station is a master node (MN) in the dual connectivity.

19. A communication apparatus, comprising:
one or more processors and one or more memories, wherein
the one or more processors are configured to execute programs stored in the one or more memories to cause the apparatus perform operations comprising:
sending a first message, or a third message, to a terminal, wherein
the first message indicates to not retain first application layer measurement configuration information, and
the third message indicates to retain the first application layer measurement configuration information, wherein
the first application layer measurement configuration information is received by the terminal from a second base station before the first message or the third message is received, and
the first application layer measurement configuration information is used for quality of experience (QoE) measurement of the terminal.

20. The apparatus according to claim 19, wherein the first message or the third message comprises at least one of:
a message indicating radio resource control (RRC) resume,
a message indicating a full configuration,
a message indicating at least one of dual connectivity (DC) release or add, or
a message indicating release of a secondary cell group (SCG) configuration.

21. The apparatus according to claim 19, wherein
the first message excludes an application layer measurement configuration identifier of the first application layer measurement configuration information to indicate to release the first application layer measurement configuration information; or
the first message excludes a first indication information field to indicate to release the first application layer measurement configuration information.

* * * * *